(12) United States Patent
Khandekar et al.

(10) Patent No.: US 9,107,239 B2
(45) Date of Patent: Aug. 11, 2015

(54) SYSTEMS AND METHODS TO DEFINE CONTROL CHANNELS USING RESERVED RESOURCE BLOCKS

(75) Inventors: Aamod D. Khandekar, San Diego, CA (US); Juan Montojo, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 12/419,022

(22) Filed: Apr. 6, 2009

(65) Prior Publication Data

US 2009/0257388 A1    Oct. 15, 2009

Related U.S. Application Data

(60) Provisional application No. 61/043,106, filed on Apr. 7, 2008.

(51) Int. Cl.
| | |
|---|---|
| *H04W 72/04* | (2009.01) |
| *H04W 88/06* | (2009.01) |
| *H04W 16/14* | (2009.01) |
| *H04W 88/10* | (2009.01) |

(52) U.S. Cl.
CPC .............. *H04W 88/06* (2013.01); *H04W 16/14* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 5,825,758 A | | 10/1998 | Heikkinen et al. |
| 5,828,962 A | * | 10/1998 | Ho-A-Chuck ................ 455/446 |
| 5,867,478 A | | 2/1999 | Baum et al. |
| 5,920,862 A | | 7/1999 | Waters |
| 5,940,765 A | * | 8/1999 | Haartsen ...................... 455/462 |

(Continued)

FOREIGN PATENT DOCUMENTS

| | | |
|---|---|---|
| CN | 1219081 A | 6/1999 |
| CN | 1235745 | 11/1999 |

(Continued)

OTHER PUBLICATIONS

3GPP: "3rd Generation Partnership Project; Technical Specification Group Radio Access network; Evolved Universal Terrestrial Radio access (E-UTRA); Physical channels and Modulation (Release 8)" Internet, Citation, Mar. 2008, sections 6-6.2.4 and 6.10 to 6.10.3.2 , pp. 1-65, XP002537575.

(Continued)

*Primary Examiner* — Alex Skripnikov
(74) *Attorney, Agent, or Firm* — Anthony R. Morris

(57) ABSTRACT

Systems and methodologies are described that facilitate defining new control channels in legacy wireless networks. Control data resources for new systems can be defined over resources reserved for general data communications in the legacy wireless network specification. In this regard, legacy devices can still be supported by devices implementing new control data resources, and the new control data resources can avoid substantial interference that is typically exhibited over legacy control and/or reference signal resources by instead using the general data resources. In addition, new system devices can avoid scheduling data communication resources over the new control resources to create a substantially non-interfered global control segment. Control data can be transmitted over the segment using beacon-based technologies, reuse schemes, and/or the like.

18 Claims, 16 Drawing Sheets

(56) References Cited

U.S. PATENT DOCUMENTS

| | | | |
|---|---|---|---|
| 5,970,414 A | 10/1999 | Bi et al. |
| 6,337,988 B1 | 1/2002 | Agin et al. |
| 6,473,619 B1 | 10/2002 | Kong et al. |
| 6,498,932 B1 | 12/2002 | Silventoinen et al. |
| 6,728,550 B1 | 4/2004 | Boehnke et al. |
| 6,795,419 B2 | 9/2004 | Parantainen et al. |
| 6,985,498 B2 | 1/2006 | Laroia et al. |
| 7,302,276 B2 | 11/2007 | Bernhardsson et al. |
| 7,426,395 B2 | 9/2008 | Stephens |
| 7,450,559 B2 | 11/2008 | Schotten et al. |
| 7,453,912 B2 | 11/2008 | Laroia et al. |
| 7,522,919 B2 | 4/2009 | Yoon et al. |
| 7,555,300 B2 | 6/2009 | Scheinert et al. |
| 7,574,224 B2 | 8/2009 | Lane et al. |
| 7,590,169 B2 | 9/2009 | Gaal |
| 7,657,277 B2 | 2/2010 | Montojo et al. |
| 7,751,510 B2 | 7/2010 | Budianu et al. |
| 7,796,639 B2 | 9/2010 | Buckley et al. |
| 7,830,907 B1 | 11/2010 | Petranovich et al. |
| 7,920,494 B2 | 4/2011 | Stewart et al. |
| 8,077,649 B2 | 12/2011 | Cai |
| 8,077,654 B2 | 12/2011 | Sutivong et al. |
| 8,077,801 B2 | 12/2011 | Malladi |
| 8,085,831 B2 | 12/2011 | Teague |
| 8,254,360 B2 | 8/2012 | Julian et al. |
| 2001/0001609 A1 | 5/2001 | Mikuni et al. |
| 2001/0014608 A1 | 8/2001 | Backstrom et al. |
| 2002/0168994 A1 | 11/2002 | Terry et al. |
| 2003/0101404 A1 | 5/2003 | Zhao et al. |
| 2003/0119452 A1 | 6/2003 | Kim et al. |
| 2004/0022176 A1 | 2/2004 | Hashimoto et al. |
| 2004/0190482 A1 | 9/2004 | Baum et al. |
| 2004/0198235 A1 | 10/2004 | Sano |
| 2004/0203734 A1* | 10/2004 | Ishii .................... 455/426.1 |
| 2005/0163070 A1 | 7/2005 | Farnham et al. |
| 2005/0277425 A1 | 12/2005 | Niemela et al. |
| 2006/0045050 A1 | 3/2006 | Floros et al. |
| 2006/0111137 A1 | 5/2006 | Mori et al. |
| 2006/0286995 A1* | 12/2006 | Onggosanusi et al. ....... 455/522 |
| 2007/0021075 A1 | 1/2007 | Nakao |
| 2007/0036066 A1 | 2/2007 | Thomas et al. |
| 2007/0047483 A1 | 3/2007 | Khan |
| 2007/0070967 A1 | 3/2007 | Yang et al. |
| 2007/0082619 A1 | 4/2007 | Zhang et al. |
| 2007/0104151 A1 | 5/2007 | Papasakellariou et al. |
| 2007/0167160 A1 | 7/2007 | Asanuma et al. |
| 2007/0189244 A1 | 8/2007 | del Prado Pavon et al. |
| 2007/0195899 A1 | 8/2007 | Bhushan et al. |
| 2007/0202913 A1 | 8/2007 | Ban |
| 2007/0242618 A1 | 10/2007 | Sakoda et al. |
| 2007/0248113 A1 | 10/2007 | Ko et al. |
| 2007/0253442 A1* | 11/2007 | Yu et al. .................. 370/464 |
| 2007/0258357 A1 | 11/2007 | Akita |
| 2007/0275746 A1 | 11/2007 | Bitran |
| 2008/0031307 A1 | 2/2008 | Fukuoka et al. |
| 2008/0032744 A1 | 2/2008 | Khan et al. |
| 2008/0049690 A1 | 2/2008 | Kuchibhotla et al. |
| 2008/0056201 A1 | 3/2008 | Bennett |
| 2008/0081598 A1* | 4/2008 | Chandra et al. ............ 455/414.1 |
| 2008/0095133 A1 | 4/2008 | Kodo et al. |
| 2008/0130612 A1 | 6/2008 | Gorokhov et al. |
| 2008/0132263 A1 | 6/2008 | Yu et al. |
| 2008/0144612 A1* | 6/2008 | Honkasalo et al. ........... 370/370 |
| 2008/0232396 A1 | 9/2008 | Buckley et al. |
| 2009/0052381 A1 | 2/2009 | Gorokhov et al. |
| 2009/0052403 A1 | 2/2009 | Hokao |
| 2009/0080382 A1* | 3/2009 | Chen et al. ................ 370/331 |
| 2009/0097447 A1 | 4/2009 | Han et al. |
| 2009/0129268 A1 | 5/2009 | Lin et al. |
| 2009/0130979 A1 | 5/2009 | Bhushan et al. |
| 2009/0131061 A1 | 5/2009 | Palanki et al. |
| 2009/0149187 A1 | 6/2009 | Miki et al. |
| 2009/0185632 A1* | 7/2009 | Cai et al. .................. 375/260 |
| 2009/0199069 A1 | 8/2009 | Palanki et al. |
| 2009/0219838 A1 | 9/2009 | Jia et al. |
| 2009/0219839 A1 | 9/2009 | Zhao et al. |
| 2009/0252077 A1 | 10/2009 | Khandekar et al. |
| 2010/0009687 A1 | 1/2010 | Koivisto et al. |
| 2010/0014286 A1 | 1/2010 | Yoneda et al. |
| 2010/0062783 A1 | 3/2010 | Luo et al. |
| 2010/0091702 A1 | 4/2010 | Luo et al. |
| 2010/0097972 A1 | 4/2010 | Parkvall et al. |
| 2010/0201188 A1 | 8/2010 | Robbins |
| 2010/0329171 A1 | 12/2010 | Kuo et al. |
| 2011/0103286 A1 | 5/2011 | Montojo et al. |
| 2011/0103338 A1 | 5/2011 | Astely et al. |
| 2011/0235744 A1 | 9/2011 | Ketchum et al. |

FOREIGN PATENT DOCUMENTS

| | | |
|---|---|---|
| CN | 1770892 A | 5/2006 |
| CN | 1909417 A | 2/2007 |
| CN | 101094433 A | 12/2007 |
| EP | 0917305 A2 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 A2 | 7/2006 |
| JP | 11098571 A | 4/1999 |
| JP | 2004260692 A | 9/2004 |
| JP | 2004274745 A | 9/2004 |
| JP | 2006505978 A | 2/2006 |
| JP | 2006135673 A | 5/2006 |
| JP | 2006311465 A | 11/2006 |
| JP | 2007053438 A | 3/2007 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007251855 A | 9/2007 |
| JP | 2007527678 A | 9/2007 |
| JP | 2007529915 A | 10/2007 |
| JP | 2007300453 A | 11/2007 |
| JP | 2007335913 A | 12/2007 |
| JP | 2007538462 T | 12/2007 |
| JP | 2008053858 A | 3/2008 |
| JP | 2008219637 A | 9/2008 |
| JP | 2008288736 A | 11/2008 |
| JP | 2009510975 A | 3/2009 |
| JP | 2009246501 A | 10/2009 |
| JP | 2009538584 A | 11/2009 |
| RU | 2150176 | 5/2000 |
| RU | 2165678 C2 | 4/2001 |
| RU | 2216103 C2 | 11/2003 |
| RU | 2002129901 A | 3/2004 |
| RU | 2236757 C2 | 9/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO9616524 | 5/1996 |
| WO | 9809469 A1 | 3/1998 |
| WO | 0013426 A2 | 3/2000 |
| WO | WO0135692 A1 | 5/2001 |
| WO | WO0178440 | 10/2001 |
| WO | WO03039057 | 5/2003 |
| WO | 03101141 A1 | 12/2003 |
| WO | WO2004019537 A2 | 3/2004 |
| WO | 2004043096 A2 | 5/2004 |
| WO | 2005062798 A2 | 7/2005 |
| WO | 2005088873 A1 | 9/2005 |
| WO | 2006001143 A1 | 1/2006 |
| WO | WO2006007318 A1 | 1/2006 |
| WO | WO2006020032 | 2/2006 |
| WO | 2006038694 A1 | 4/2006 |
| WO | 2006043588 A1 | 4/2006 |
| WO | 2006106676 A1 | 10/2006 |
| WO | WO2006134032 | 12/2006 |
| WO | WO2007024895 | 3/2007 |
| WO | WO2007025308 | 3/2007 |
| WO | 2007044173 A2 | 4/2007 |
| WO | WO2007044281 | 4/2007 |

(56) References Cited

FOREIGN PATENT DOCUMENTS

| WO | 2007081130 A1 | 7/2007 |
|---|---|---|
| WO | WO2007091245 A2 | 8/2007 |
| WO | WO2007106980 | 9/2007 |
| WO | 2007119452 A1 | 10/2007 |
| WO | 2007137920 A1 | 12/2007 |
| WO | 2008023928 A2 | 2/2008 |
| WO | WO2008049136 | 4/2008 |
| WO | WO2008086149 | 7/2008 |

OTHER PUBLICATIONS

Hooli K et al: "Flexible Spectrum Use between WINNER Radio Access Networks" Proc. IST Mobile & Wireless, Myconos (Greece),, Jun. 4, 2006, pp. 1-5, XP003020776 p. 1, paragraph 1, p. 2, paragraph 2.

International Search Report and Written Opinion—PCT/US08/079888, International Search Authority—European Patent Office, Feb. 23, 2009.

International Search Report and Written Opinion—PCT/US2008/075238, International Search Authority—European Patent Office—May 11, 2009.

International Search Report and Written Opinion—PCT/US2008/080220, International Search Authority—European Patent Office—Jun. 26, 2009.

International Search Report and Written Opinion—PCT/US2009/039683, International Search Authority—European Patent Office—Nov. 9, 2009.

International Search Report and Written Opinion—PCT/US2009/039717, International Search Authority—European Patent Office—Sep. 23, 2009.

LG Electronics: "Multiplexing of MBMS and unicast transmission in E-UTRA downlink; R1-060054" 3GPP TSG-RAN WG1 Meeting AD HOC LTE, vol. R1-060054, Jan. 23, 2006, pp. 1-5, XP003016637.

NTT DoCoMo et al., "L1/L2 Control Channel Structure for E-UTRA Downlink," 3GPP TSG RAN WG1 Meeting 45, R1-061181, Shanghai, China, May 8-12, 2006, pp. 1-17.

NTT DoCoMo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.

Qualcomm Europe: "Neighbor Cell Search—Analysis and Simulations" 3GPP Draft; R1-063432, 3rd Generation Partnership Project (36PP), Mobile Competence Centre ; 650, Route Des Lucioles ; F-06921 Sophia-Antipolis Cedex ; France, no. Riga, Latvia; 20061106, Nov. 1, 2006, XP050103869 paragraph [04.1]-paragraph [04.3].

Ravi Palanki "Update on out-of-band pilot design for LBC FDD," ftp://ftp.3gpo2.org/TSGC/Working/2006/2006-12-Mau/TSG-C-2006-12-Maui/WG3/C30-20061204-045_QCOM_update_on_out-of-band_pilot_design_for_LBC_FDD.pdf.December 2006.

"High Performance Space Frequency Interleaved MIMO-OFDM Eigen mode Transmission systems," Vehicular Technology Conferences, 2006, VTC-2006 IEEE 64th, Sep. 25-28, 2006, pp. 1-5.

Nokia et al: "Issues regarding MBSFN subframes", 3GPP Draft; R1-074863, 3rd Generation Partnership Project (3GPP), Mobile Competence Centre ; 658, Route Des Lucioles , F-06921 Sophia-Antipolis Cedex; France, vol. RAN WG1, no. Korea; 20071030, Oct. 30, 2007, XP050108319.

3rd Generation Partnership Project; Technical Specification Group Radio Access Network; Multiplexing and channel coding (FDD); 3GPP TS 25.212 V5.10.0 (Jun. 2005) Release 5.

NEC Group: "Some issues related to MBSFN sub-frame structure", R1-071501, RAN WG1 meeting 48bis, Mar. 30, 2007 ,http://www.3gpp.org/ftp/tsg_ran/WG1_RL1/TSGR1_48b/Docs/R1-071501.zip.

Taiwan Search Report—TW098111566—TIPO—Mar. 21, 2013.

LG Electronics: "DL PDCCH/PCFICH/RS transmission in MBSFN subframe," R1-073477, 3GPP TSG RAN WG1 #50,7.2.3, Aug. 20-24, 2007, pp. 2.

3GPP TS 36.211, V8.2.0 (Mar. 2008), 3rd Generation Partnership Project; Technical Specification Group Radio Access Network; Evolved Universal Terrestrial Radio Access (E-UTRA); Physical Channels and Modulation (Release 8), Mar. 2008, http://www.3gpp.org/ftp/Specs/archive/36_series/36.211/36211-820.zip.

Nokia Corporation, et al., "On Supporting Dynamic MBSFNs and Transmission Mode Switching in MBMS," 3GPP Draft; R2-074849 Dynamic MBSFNS and Mode Switching, 3rd Generation Partnership Project (3GPP), Mobile Competence Centre; 650, Route Des Lucioles; F-06921 Sophia-Antipolis Cedex; France; vol. RAN WG2, No. Jeju, South Korea; 20071105-20071109, Nov. 12, 2007, XP050603358, [Retrieved on Nov. 12, 2007].

\* cited by examiner

SYSTEMS AND METHODS TO DEFINE CONTROL CHANNELS USING RESERVED RESOURCE BLOCKS

CROSS-REFERENCE

This application claims the benefit of U.S. Provisional Application Ser. No. 61/043,106, filed Apr. 7, 2008, and entitled "SYSTEMS AND METHODS TO DEFINE CONTROL CHANNELS USING RESERVED RESOURCE BLOCKS," the entirety of which is incorporated herein by reference.

BACKGROUND

I. Field

The present disclosure relates generally to wireless communications and more specifically to defining and utilizing control channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, the base stations and mobile devices can exchange control data relating to communication quality over uplink and/or downlink resources (e.g., channel quality, signal-to-noise ratio, acknowledgement indicators, etc.). For example, the uplink and/or downlink can be partitioned into portions of frequency over given time periods, such as a number of orthogonal frequency division multiplexing (OFDM) symbols. One or more portions of frequency in a given period of time, such as a frame or sub-frame, can be reserved for control data communications. Also, one or more disparate portions of frequency in the given frame/sub-frame can be reserved for transmitting reference signals or other signals. Remaining portions of frequency in the frame/sub-frame can be allocated for data communication. Related frame/sub-frame formatting can be known by base stations and mobile devices such that the mobile devices can expect to receive control data from the base stations over the portions reserved for control data and can expect the base station to assign part of the remaining portions for general uplink data communication. Additionally, since a number of base stations and devices utilize the same portions of frequency over the same portions of time for transmitting control data, reference signals, etc., these portions can exhibit high interference from the various base station and device transmissions.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating defining control data resources in portions of frequency over time allocated for communicating data in a wireless network. For example, portions of frequency over time can be reserved for transmitting control data and/or other signals, such as reference signals, where remaining portions can be utilized for general data communication. Control data resources can be defined over the general data communication portions and utilized by certain devices so as not to disturb current control resources for legacy devices in the wireless network. In addition, the portions already reserved for transmitting control data can be avoided as legacy devices in the wireless network likely exhibit highly dominant interference over those portions. Moreover, techniques can be utilized over the newly defined control data resources to mitigate interference, such as control resource blanking, control data beacons, and/or frequency reuse technologies, as described herein.

According to related aspects, a method for defining new control channels in a wireless communications network is provided. The method can include reserving a portion of wireless communication resources for general data communications according to a legacy network specification. The method also can include allocating a subset of the portion of wireless communication resources for communicating control data according to a disparate network specification and transmitting control data over the subset of the portion of wireless communication resources.

Another aspect relates to a wireless communications apparatus. The wireless communications apparatus can include at least one processor configured to define a portion of wireless communications resources for data communications based at least in part on a legacy network specification. The processor is further configured to reserve a subset of the portion of wireless communications resources for communicating control data and transmit control data over the subset. The wireless communications apparatus also comprises a memory coupled to the at least one processor.

Yet another aspect relates to a wireless communications apparatus facilitates defining new control channels over legacy wireless networks. The wireless communications apparatus can comprise means for grouping a portion of wireless communication resources for data communication according to a legacy network specification. The wireless communications apparatus can additionally include means for allocating a subset of the reserved portion of wireless communication resources for communicating control data and means for transmitting control data over the subset of resources.

Still another aspect relates to a computer program product, which can have a computer-readable medium including code for causing at least one computer to reserve a portion of wireless communication resources for general data communications according to a legacy network specification. The computer-readable medium can also comprise code for causing the at least one computer to allocate a subset of the portion of wireless communication resources for communicating control data according to a disparate network specification and code for causing the at least one computer to transmit control data over the subset of the portion of wireless communication resources.

Moreover, an additional aspect relates to an apparatus. The apparatus can include a legacy specification component that allocates a portion of wireless communication resources for general data communication according to a legacy network specification. The apparatus can further include a new control data component that defines a subset of the portion of wireless communication resources for transmitting control data and a transmitter component that transmits control data over the subset.

According to further aspects, a method for receiving control data over new control channels in a wireless communication network is provided. The method can include receiving control data over a set of control data resources defined within general data communication resources of a legacy network specification. The method further includes decoding the control data to facilitate communicating with an access point.

Another aspect relates to a wireless communications apparatus. The wireless communications apparatus can include at least one processor configured to define a set of control data resources over a portion of wireless communication resources allocated for general data communication in a legacy network and receive control data from an access point over the control data resources. The processor is further configured to decode the control data to determine a general data resource allocation from the access point. The wireless communications apparatus also comprises a memory coupled to the at least one processor.

Yet another aspect relates to a wireless communications apparatus that facilitates receiving control data over newly defined control channels. The wireless communications apparatus can comprise means for allocating a set of control data resources from a portion of wireless communication resources reserved for data communication in a legacy network. The wireless communications apparatus can additionally include means for receiving control data from an access point over the set of control data resources.

Still another aspect relates to a computer program product, which can have a computer-readable medium including code for causing at least one computer to receive control data over a set of control data resources defined within general data communication resources of a legacy network specification. The computer-readable medium can also comprise code for causing the at least one computer to decode the control data to facilitate communicating with an access point.

Moreover, an additional aspect relates to an apparatus. The apparatus can include a new system specification component that allocates a set of control data resources from a portion of wireless communication resources reserved for data communication in a legacy network. The apparatus can further include a receiver component that receives control data from an access point over the set of control data resources.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
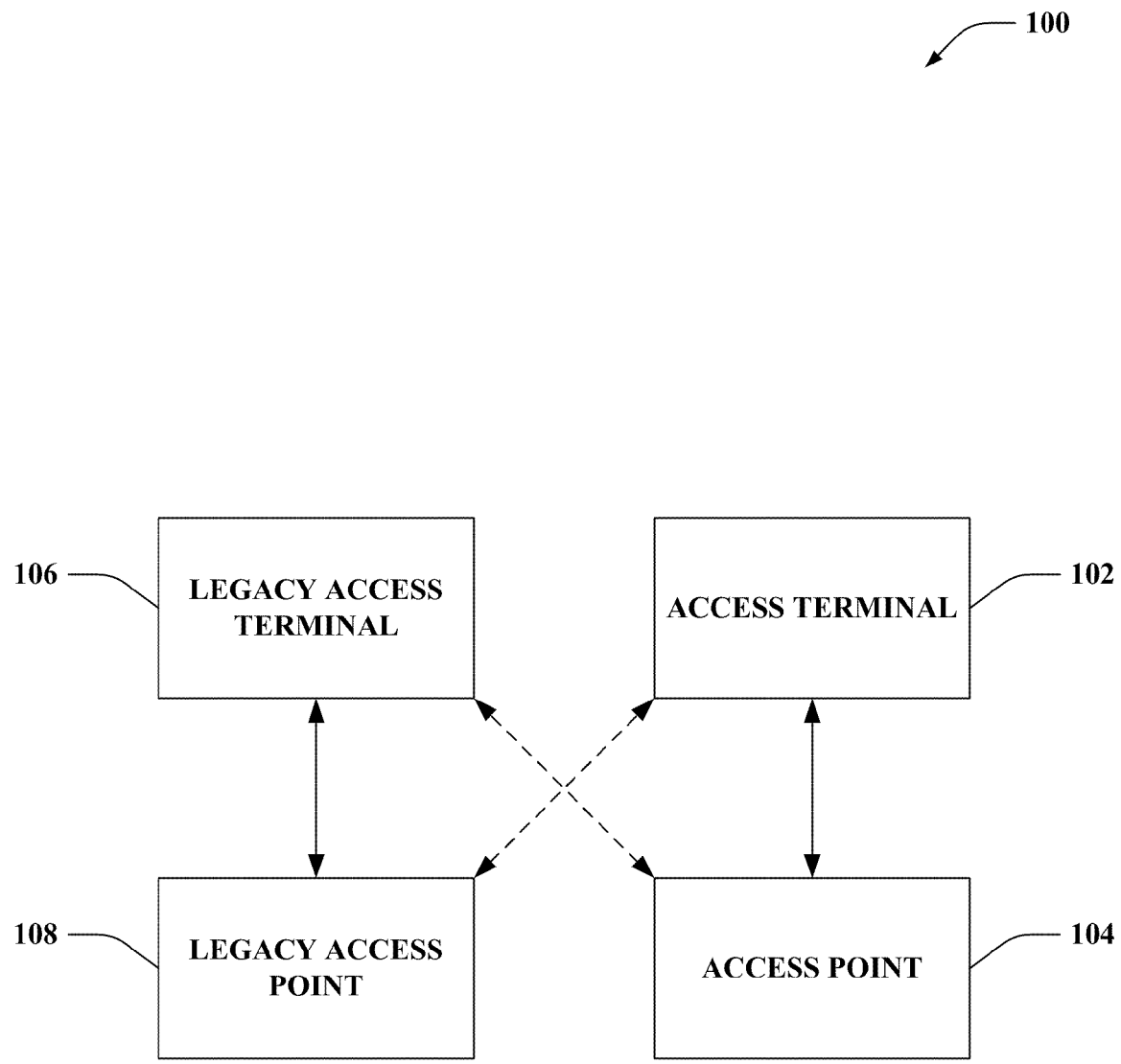
FIG. 1 is a block diagram of a system for defining and utilizing new control resources in a wireless network.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates defining and utilizing control data resources over bandwidth used for general data communications. In particular, an access terminal 102 is depicted that communicates with an access point 104 to receive access to a wireless network. Similarly, a legacy access terminal 106 is shown that communicates with a legacy access point 108 to receive access to a disparate or the same wireless network. As illustrated, the access terminal 102 can additionally or alternatively communicate with the legacy access point 108 as well and legacy access terminal 106 with access point 104. It is to be appreciated that access point 104 and legacy access point 108 can be base stations, mobile devices, mobile base stations, femtocells, relays, and/or substantially any component that provides access to a wireless network. In one example, the legacy access terminal 106 and legacy access point 108 can be provisioned with information regarding communicating in the wireless network 100 according to one or more specifications.

For example, the wireless network 100 can utilize an OFDM technology to manage communication resources. In addition, the wireless network 100 can divide OFDM symbols, which can be portions of frequency (e.g., a collection of tones) over a time period, for different types of communication. In one example, the wireless network 100 can operate according to a specification that defines communication frames, which can be a collection of OFDM symbols. According to a specification, certain OFDM symbols, or portions thereof, in a given frame can be reserved for certain uses. For example, a portion of one or more OFDM symbols can be reserved for control data communications (e.g., assignment messages, data regarding quality of communication over a set of resources, etc.), reference signal communications (e.g., beacon or other source identifying signal transmitted by access points, etc.), and/or the like. Remaining portions in the frame can be utilized for general data communication. Thus, for example, the legacy access terminal 106 and legacy access point 108 can communicate according to a legacy specification, reserving appropriate portions of the one or more OFDM symbols for legacy control data, reference signals, etc. In this regard, the legacy access point 108 can define at least a portion of remaining resources for general data communication and can assign a set of these resources to the legacy access terminal 106 to facilitate general data communication therewith.

Access terminal 102 and access point 104 can communicate using a new specification, in one example. The new specification can utilize many similar parameters as the legacy specification (e.g., similar definition of OFDM symbols, sub-frame formats, etc.), but in an example, the new specification can define new control data resources that can be utilized by the access terminal 102 and access point 104. According to the new specification, for instance, the access terminal 102 and access point 104 can define the new control data resources over portions of resources specified as general data communication resources (or negatively implied as such) in the legacy specification. In this regard, the new control data resources utilized by the access terminal 102 and access point 104 do not interfere with the legacy control data resources, reference signal resources, and/or the like defined by the legacy specification.

By utilizing legacy data channel resources for defining the new control data resources, access point 104 can still additionally support communication with the legacy access terminal 106 by continuing to transmit legacy control data over the legacy control data resources. In this example, to mitigate interference, the access point 104 can avoid scheduling general data communication resources to the legacy access terminal 106 that conflict with the new control data resources, though the new control data resources were previously defined for such data in the legacy specification. Similarly, the legacy access point 108 can additionally support legacy communication with the access terminal 102, in one example, using the legacy specification. In this regard, new specifications can operate over networks using legacy specifications while still supporting the legacy specifications and without causing or receiving substantial interference over high traffic resources in the legacy system, such as over control data resources, reference signal resources, and/or the like.

Figure 2:
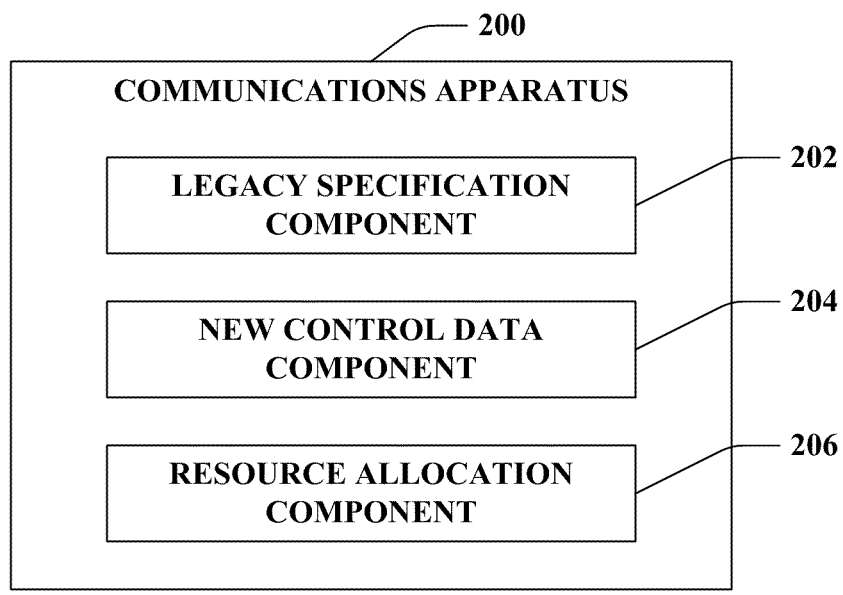
FIG. 2 is an illustration of an example communications apparatus for employment within a wireless communications environment.

Referring next to FIG. 2, a communications apparatus 200 that can participate in a wireless communications network is illustrated. The communications apparatus 200 can be a base station, mobile device, a portion thereof, or substantially any device that can provide access to a wireless network. The communications apparatus 200 can include a legacy specification component 202 that receives a specification defining one or more parameters for communicating in a wireless network, a new control data component 204 that can specify new control data resources for communicating over the wireless network, and a resource allocation component 206 that can allocate resources to devices in a wireless network for communicating with the communications apparatus 200.

According to an example, the legacy specification component 202 can obtain one or more communication parameters related to a wireless network within which the communications apparatus 200 participates. The communication parameters can define various aspects of communicating, such as OFDM symbol information (e.g., frequency ranges, time periods for the symbols, etc.) radio frame/sub-frame formats, and/or the like. In addition, the communication parameters can define resource usage information, such as portions OFDM symbols in a frame/sub-frame utilized for transmitting control data, general data, reference signals, and/or the like. Thus, the communications apparatus 200 can transmit data according to the parameters, including transmitting control data over the specified resources reserved for control data, reference signals over the specified resources reserved for reference signal data, and transmitting general data over remaining resources. It is to be appreciated that the communication parameters received by the legacy specification component 202 can be hardcoded, specified in a configuration file, received from one or more network devices, and/or the like.

In an example, the resource allocation component 206 can schedule resources for communicating with an access terminal (not shown). The allocation component 206, in one example, can assign a portion of the remaining resources for general data communication with the access terminal so as not to interfere with defined control data resources, reference signal resources, etc., that likely exhibit high interference since they can be commonly defined and used by a plurality of communications apparatuses. It is to be appreciated that resources for general data communication can be negatively implied as resources not otherwise reserved and/or explicitly defined in information received by the legacy specification component 202.

In addition, the new control data component 204 can define new control data resources for use in communicating with different access terminals (not shown). In one example, the new control data resources can relate to a new system specification, as described. The new control data component 204 can similarly receive information (e.g., from hardcoding, a configuration file, from one or more network devices, and/or the like) relating to the new system specification. As mentioned, many aspects can be similar to the legacy specification, such as OFDM configuration, frame/sub-frame utilization, etc., while sub-frame formatting, control data resources and/or other resource allocation can vary. In this regard, the new control data component 204 can define new control data according to the new system specification using resources previously defined for general data communication by the legacy specification component 202. This allows the communications apparatus 200 to transmit and support legacy control data, reference signals, etc., while additionally providing new control data resources in resources reserved for general data communication in legacy systems, so as not to interfere with the legacy control data, reference signals, etc.

Also, the resource allocation component 206 can avoid assigning general data communication resources over resources reserved by the new control data component 204 for transmitting control data. This can be so even where the resource allocation component 206 is assigning resources to a legacy access terminal. Thus, interference from the communications apparatus 200 can be mitigated over the new control data resources. This can also be beneficial where the communications apparatus 200 is geographically near another access point that supports the new control data resource definition such that the disparate access point can also avoid scheduling general data resources to legacy devices over those resources reserved for the new control data. In this regard, a global control segment can be defined by multiple communications apparatuses where the apparatuses all use the global segment for transmitting new control data and silence transmission thereover when not transmitting control data. As described infra, it is to be appreciated that the new control data component 204 can define and/or utilize control data resources according to additional interference mitigation schemes, such as beacon-based control data transmissions, blanking over the global segment, reuse techniques, and/or the like. In addition, in one example, the new control data component 204 can notify one or more wireless devices of the new control data resources by utilizing the legacy control data resources.

Figure 3:
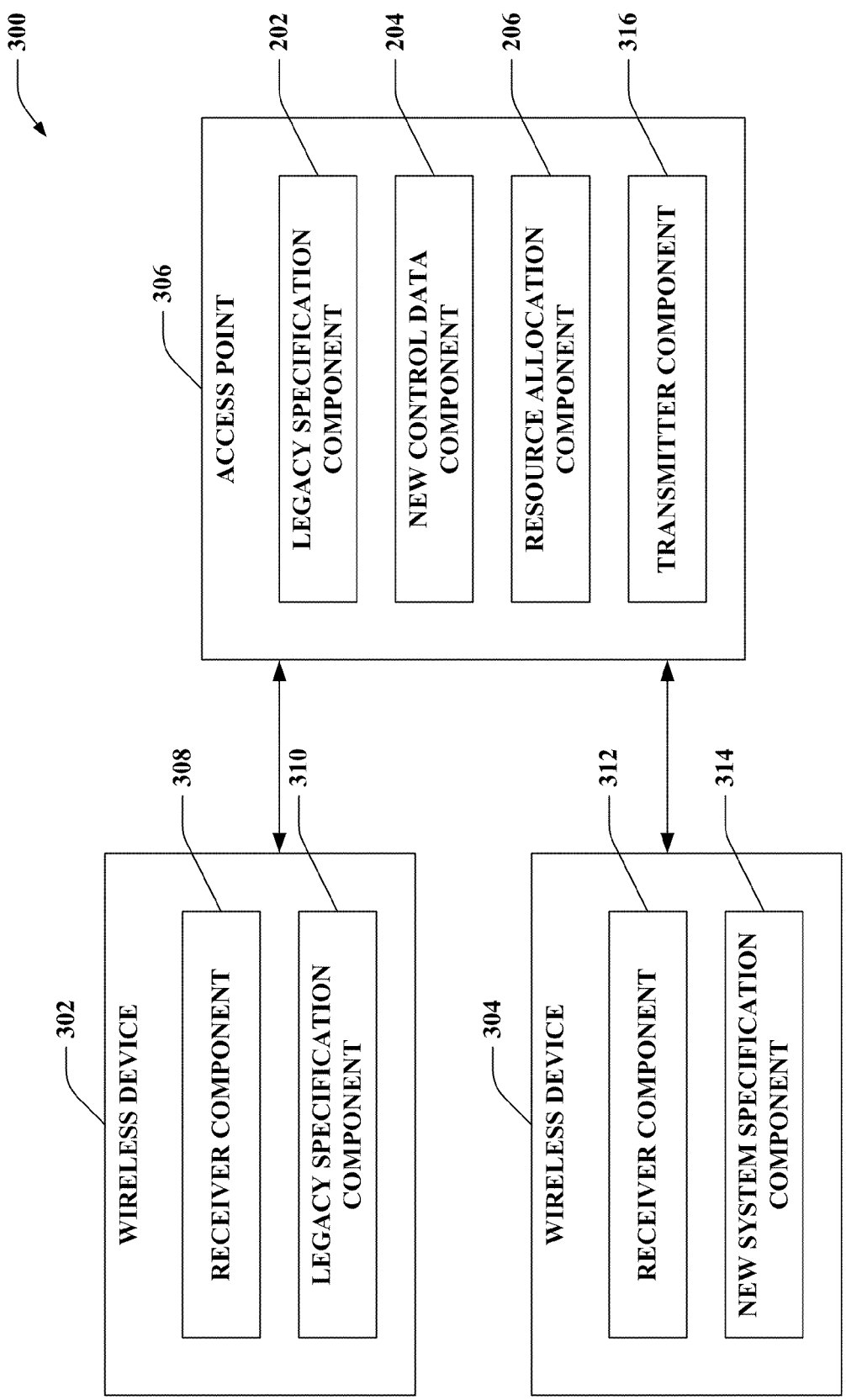
FIG. 3 illustrates an example wireless communication network that effectuates utilizing newly defined control data resources.

Now referring to FIG. 3, illustrated is a wireless communications system 300 that facilitates communicating according to multiple specifications in a wireless network. Wireless device 302 and 304 and/or access point 306 can be a mobile device (including not only independently powered devices, but also modems, for example), a base station, and/or portion thereof. In one example, the wireless devices 302 and 304 can communicate using peer-to-peer or ad hoc technology where the devices 302 and 304 are of similar type. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless devices 302 and 304 can be present in one another and/or in the wireless device 306 as well and vice versa, in one example; the configuration depicted excludes these components for ease of explanation.

Wireless device 302 can include a receiver component 308 that obtains communications from an access point in a wireless network and a legacy specification component 310 that can define one or more parameters in a specification related to communicating in the wireless network. In one example, as described, the legacy specification component can define the parameters based on hardcoding, configuration data received from a file, disparate network component, or otherwise, and/or the like. Similarly, wireless device 304 can comprise a receiver component 312 that obtains communications from an access point in a wireless network and a new system specification component 314 that defines one or more parameters of a new specification that can be utilized in communicating over the wireless network.

Access point 306 can include a legacy specification component 202 that can be similar to the legacy specification component 310 of the wireless device 302, specifying one or more parameters for communicating over a wireless network as received from hardcoding, configuration data received from a file, disparate network component, or otherwise, and/or the like. Access point 306 can also include a new control data component 204 that can define control data for a new system over generic data resources, a resource allocation component 206 that assigns communication resources to one or more wireless devices, and a transmitter component 316 that can transmit control data, resource assignments, reference signals, and/or the like over a wireless network.

According to an example, the legacy specification component 202 can receive parameters for communication in a wireless network. For example, the parameters can relate to OFDM symbol configurations, as described, that define portions of frequency over time corresponding to the symbols. In one example, the legacy specification component 202 can receive parameters for communicating in a 3GPP LTE network. Thus, for example, the legacy specification component 202 can define a number of radio frames over an approximate 10 ms interval for communicating over a forward link to the wireless devices 302 and 304 according to a 3GPP LTE specification. In addition, the legacy specification component 202 can define 10 sub-frames in a given frame that each last approximately 1 ms. Furthermore, the legacy specification component 202 can divide the sub-frames into two slots, each of which is divided into multiple resource blocks (RB), which can include 12 subcarriers (e.g., frequency portions of an OFDM symbol). The subcarriers can be contiguous or otherwise, for instance.

In this example, the legacy specification component 202 can further define sub-frame formats on the forward link. In an example sub-frame format in 3GPP LTE, the first N OFDM symbols of a sub-frame can be reserved for transmitting control data, where N ranges from 1 to 3 and is specified in disparate control data for which resources are also reserved in the given sub-frame. In addition, depending on a number of antennas of the access point 306, the legacy specification component 202 can reserve one or more subcarriers of one or more OFDM symbols for transmitting related reference signals facilitating identification of the access point 306 (e.g., symbol indices 0, 4, 7, and 11 of the sub-frame for a two antenna access point, indices 0, 1, 4, 7, 8, and 11 for a four antenna access point, etc.). It is to be appreciated that other sub-frame formats are possible. For example, the legacy specification component 202 can additionally or alternatively transmit control data and reference signals over the first two OFDM symbols in a sub-frame according to a Multicast Broadcast Multimedia Services (MBMS) Single Frequency Network (MBSFN) sub-frame format, for example.

In either case, of the remaining OFDM symbols, one or more subcarriers thereof can be grouped into RBs. The resource allocation component 206 can assign one or more RBs to the wireless device 302 and/or other legacy wireless devices for general data communication thereover, and the transmitter component 316 can transmit the assignment to the wireless device 302 over the control data resources. The receiver component 308 can receive the assignment over the control data resources and interpret the control data to determine the resource assignment. The legacy specification component 310 of the mobile device 302 can define substantially the same specification as legacy specification component 202 of the access point 306, as described above. Thus, the wireless device 302 can expect the resource assignment to be transmitted over the control data resources. Once the assignment is received, the wireless device 302 can establish the resources with the access point 306 and communicate wireless network data over the resources.

Moreover, the resources defined by the legacy specification components 202 and 310 can be referred to as channels, which can comprise portions of one or more OFDM symbols. Thus, control data resources can be grouped into channels over which certain data can be transmitted. For example, of the first N OFDM symbols reserved for control data, in the sub-frame format described above, a portion of the symbols and/or subcarriers within the symbols can define a physical downlink control channel (PDCCH) over which control data is transmitted from the access point 306 to the wireless devices 302 and/or 304, a physical hybrid automatic repeat/request indicator channel (PHICH) over which acknowledgements (ACK) and/or non-acknowledgements (NACK) related to receiving data over general data communication resources can be transmitted, and/or the like. Furthermore, the RBs in remaining OFDM symbols assigned to the wireless device 302 can comprise one or more general data communication channels. The remaining RBs used for general data communication, in one example, can be utilized for control data according to a disparate network specification, as described infra. It is to be appreciated that the RBs could additionally or alternatively be utilized for other non-data purposes, such as carrying reference signals for more antennas than are supported by the legacy specification.

In addition, the new control data component 204 can define control channels for a new system according to a specification. For example, the control channels can be utilized for uplink and/or downlink resource assignments, ACK/NACK information, channel quality indicators (CQI), and/or the like. In another example, the control channels can be utilized for interference management. For instance, the access point 306 can use the control channel to transmit a request that one or more mobile devices silence transmissions on certain resources to allow high priority traffic of other devices over the certain resources, wireless device 302 and/or 304 can transmit a request over the control channel for one or more access points to silence transmission on certain resources to facilitate scheduling forward link data without excessive interference over the certain resources, and/or the like. As described, the new control data component 204 can define a global control segment, according to the new system specification, over resources used for general data communication, as defined by the legacy specification component 202. In addition, the resource allocation component 206 can avoid assigning uplink and/or downlink resources relating to the global control segment to wireless device 302 to mitigate interference over the global control segment. As described, the new control data component 204 can define the global control segment over the legacy general data resources to avoid utilizing the legacy control channel resources or reference signal resources, which likely exhibit high interference since substantially all access points can utilize the resources.

Where access point 306 is a macrocell base station, for example, it can experience high interference from femtocells transmitting over the legacy control channel and reference signal resources; thus, defining the control channels for the new system over the data channel resources allows the macrocell base station to transmit control data over the new control channels without interference from other base stations. Indeed, where the new control channels are known by disparate base stations, a global control segment can be defined, as discussed infra, such that the other base stations additionally do not schedule data transmissions over the new control channel resources, further mitigating interference. In another example, wireless device 302 and/or 304 can be connected to a low power picocell access point, where a surrounding macrocell access point has a more desirable signal strength and thus causes interference to the wireless device 302 and/or 304 connected to the picocell access point. In this example, providing new control channels allows the picocell access point to communicate control data to the wireless device 302 and/or 304 over resources other than legacy control resources, which are likely highly interfered by the surrounding macrocell access point.

Access point 306 can, however, experience high interference from data transmissions between disparate access points and a device, for example, where the disparate access point does not define the global control segment (e.g., the disparate access points merely utilizes the legacy specification). The transmitter component 316 can avoid such interference, however, by using one or more diverse control signaling methods over the global control segment, such as beacon-based control transmissions, control channel blanking, reuse, and/or the like, as described further herein. In addition, defining the global control segment over resources reserved for data in legacy systems allows the access point 306 to support the legacy and new systems (e.g., the access point 306 can transmit legacy control data and reference signals while also transmitting new control signals over the general data communication resources).

The transmitter component 316 can transmit control data over the new control data resources, and the receiver component 312 can receive the control data. The new system specification component 314 can define parameters related to communicating with the access point 306 using the new system specification. Similarly to the legacy specification, the parameters for the new specification can be received from hardcoding, one or more devices in the wireless network (such as access point 306 or another device), a configuration file, and/or the like. In one example, the parameters can relate to OFDM symbol configuration, frame/sub-frame format, etc., which can be substantially the same as that defined in the legacy specification component 310 and/or 202. Control data resources or channels, however, can be defined over the data resources of the legacy system, as described. Thus, the new system specification component 314 can similarly define the global control segment and expect to receive control data over resources in the segment. In another example, the new system can also use reference signals similarly to the legacy system; thus, the new system specification component 314 can define the reference signal resources and expect to receive reference signals thereover, in this example.

Figure 4:
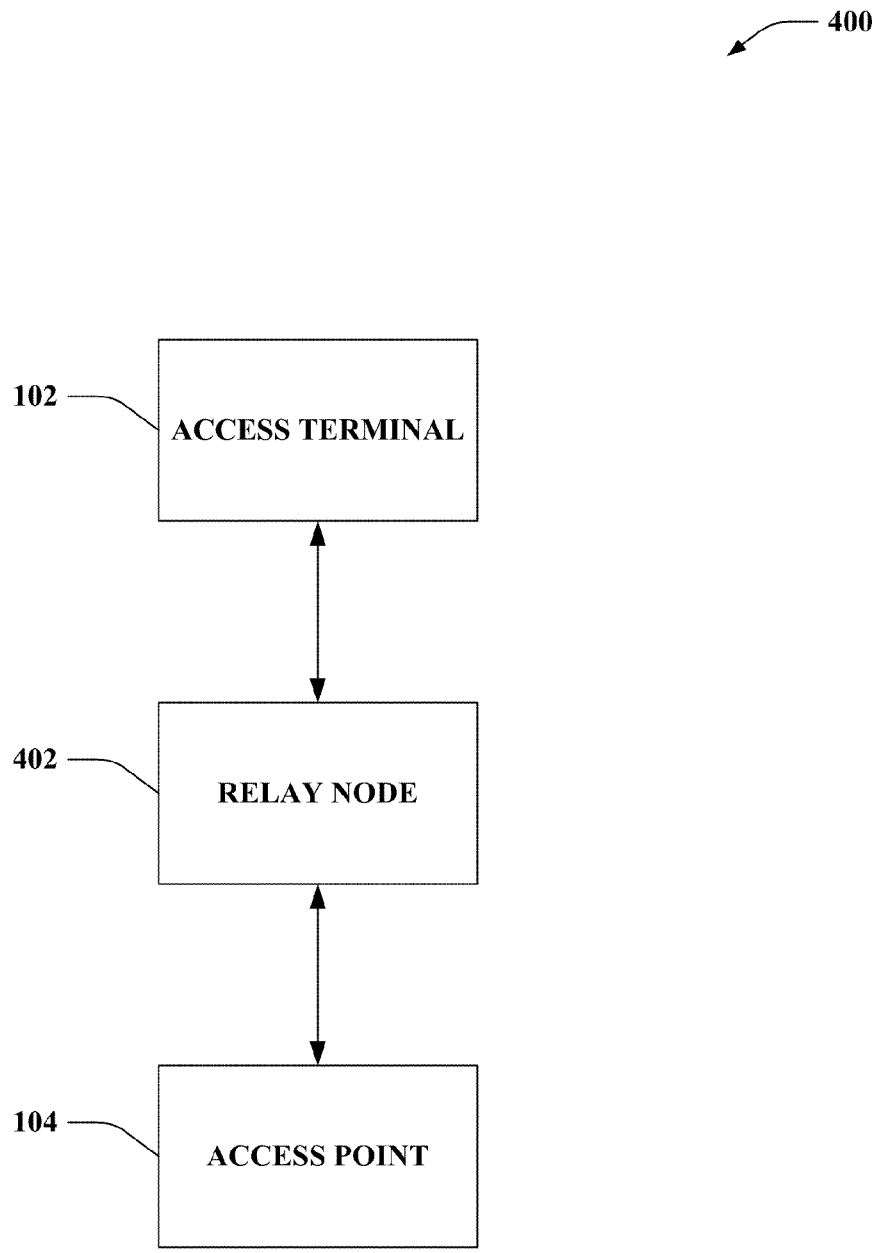
FIG. 4 illustrates an example wireless communication system that utilizes new control data resources to facilitate relay functionality.

Referring to FIG. 4, a wireless communications system 400 is illustrated that provides new control channel definition and utilization for relay nodes. In particular, an access terminal 102 is provided that communicates with an access point 104 using a relay node 402. For example, the relay node 402 can receive communications from access point 104, decode the communications, and forward the communications to the access terminal 102. The relay node 402 can additionally or alternatively facilitate communicating from the access terminal 102 to the access point 104. To reduce interference at the relay node 402, for example, it can be desirable not to transmit and receive control data using the same resources. Thus, the relay node 402 can implement functionalities described herein to create new control channels in addition to using the legacy control channels.

In this regard, the access point 104 can transmit control data to the relay node over new control channels defined in general data resources of a legacy system. This effectively frees legacy control channels at the relay node 402 for transmission, and the relay node 402 can accordingly receive the control data from the access point 104 and transmit the control data to the access terminal 102 over legacy control channels. Thus, the relay node 402 can be utilized without requiring updates to legacy access terminals. In another example, the relay node 402 can receive control data from the access point 104 over legacy control channels and can transmit the control data to the access terminal 102 over new control channels defined in resources reserved by the legacy systems for transmitting general communication data. In this example, the access terminal 102 can support the new specification without requiring modification of the access point 104. It is to be appreciated that the relay node in this example can also transmit control data using a diversity scheme, such as beacon-based control data transmissions, control channel blanking, reuse, and/or the like.

Figure 5:
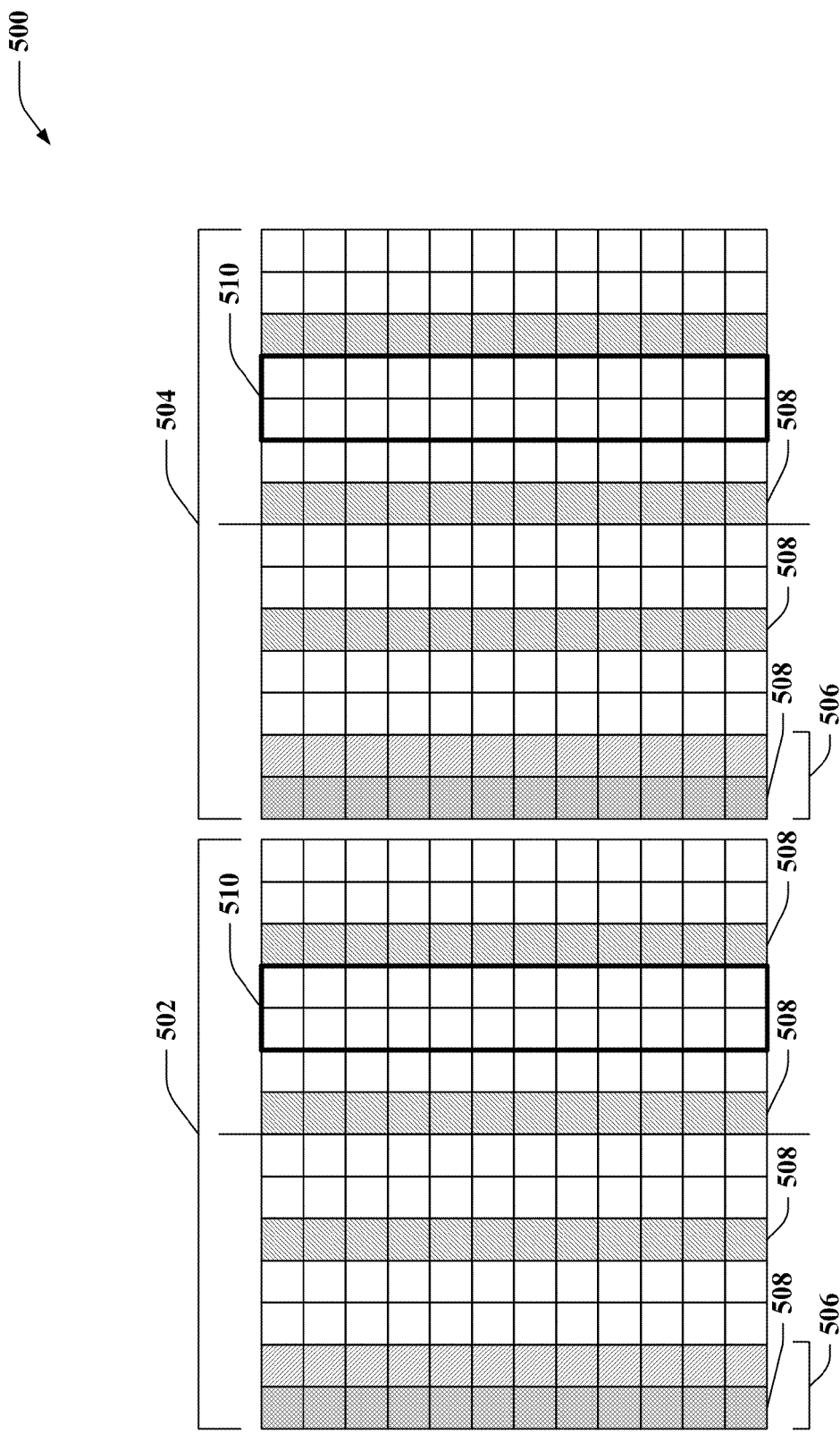
FIG. 5 illustrates example bandwidth over which a new global control segment is defined.

Turning now to FIG. 5, example portions of bandwidth 500 that can be utilized in a wireless communication network are displayed. Sub-frames 502 and 504 can be from a larger frame according to a specification, as described previously, and can each be separated into two slots. In one example, the sub-frames 502 and 504 can be 1 ms sub-frames of a larger 10 ms frame defined in a 3GPP LTE network. According to the displayed sub-frame format, the sub-frames 502 and 504 can each reserve the first N OFDM symbols for control data communications; in this example, N=2, and the reserved OFDM symbols are indicated at 506. In addition, OFDM symbols 0, 4, 7, and 11, indicated at 508, are reserved in each sub-frame 502 and 504 for transmitting reference signals. The remainder of the OFDM symbols can be reserved for transmitting data in the wireless network. OFDM symbols 510, however, are reserved for transmitting new control data. Thus, a device utilizing this scheme can additionally define a global control segment at 510 for each sub-frame over which the device can transmit control data and accordingly avoid scheduling communication resources or transmitting other data. It is to be appreciated that the global control segment need not be identified on a sub-frame basis, but could be defined for one or more sub-frames in a frame, in one example.

Figure 6:
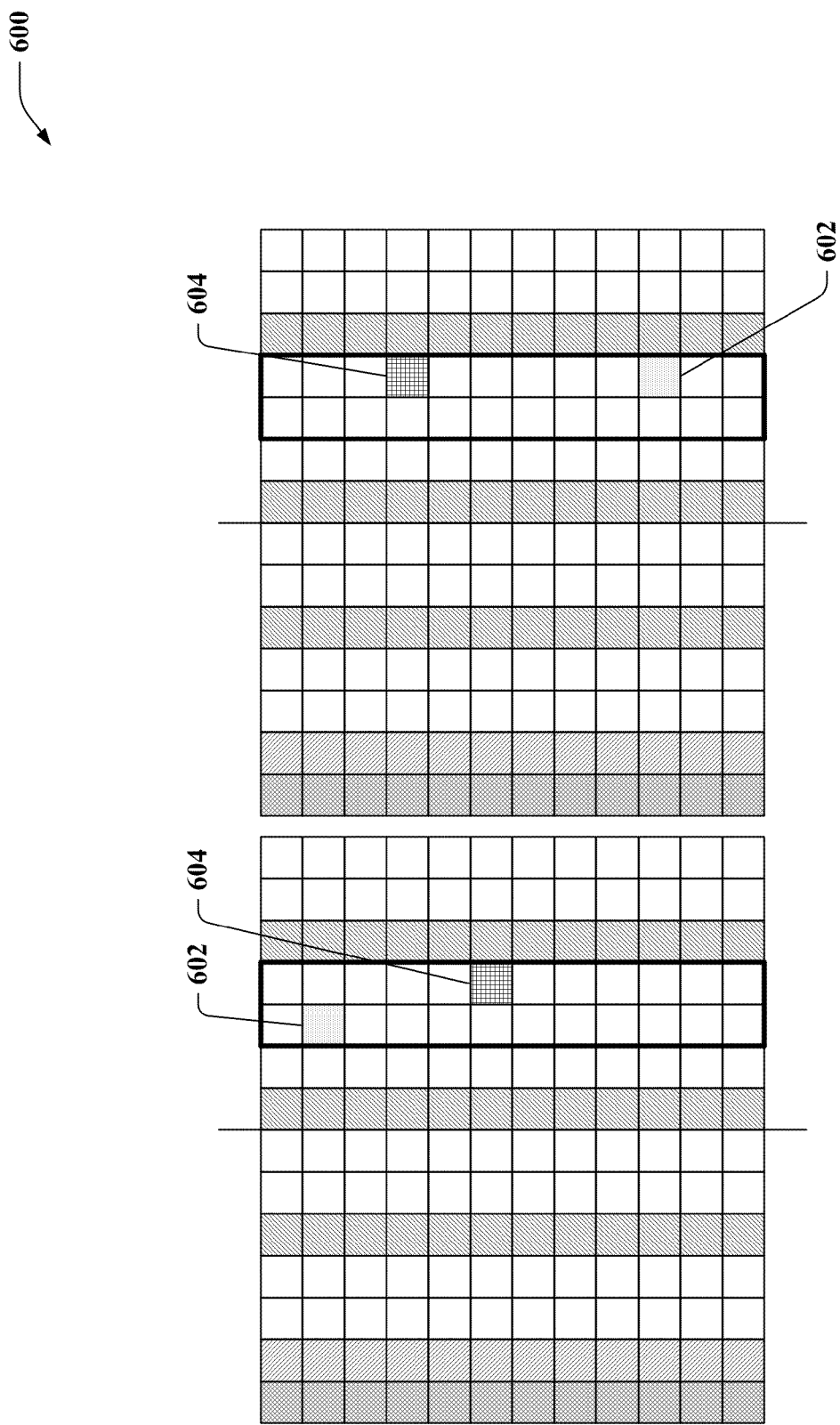
FIG. 6 illustrates example bandwidth over which new control data is transmitted using beacon signals.

Turning now to FIG. 6, example portions of bandwidth 600 that can be utilized in a wireless communication network are displayed. Similarly to previous figures, the portions of bandwidth can be sub-frames in a 3GPP LTE configuration. Additionally, certain OFDM symbols in each sub-frame can be reserved for control data and/or reference signals, as described. Moreover, a global control segment is defined over which access points can silence communication except when transmitting control data. As shown, two access points transmit control data as beacon signals over the global control segment. In the first sub-frame, at tone 602, a first access point can transmit control data as a beacon signal, which can relate to transmitting with substantially all power (or at least a relatively high amount of power) over a single tone. In this regard, control data can be heard over data communication interference from other legacy access points and/or related mobile devices, for example. At tone 604, a second access point transmits control data as a beacon signal. Similarly, the access points transmit control data at disparate beacon signals in the second sub-frame at 602 and 604. It is to be appreciated that control data beacon transmitting schemes can be developed based on identifiers of a related access point, functionalities of the access point, service provider of the access point, location of the access point, beacon transmitting schemes of surrounding access points, and/or the like.

Figure 7:
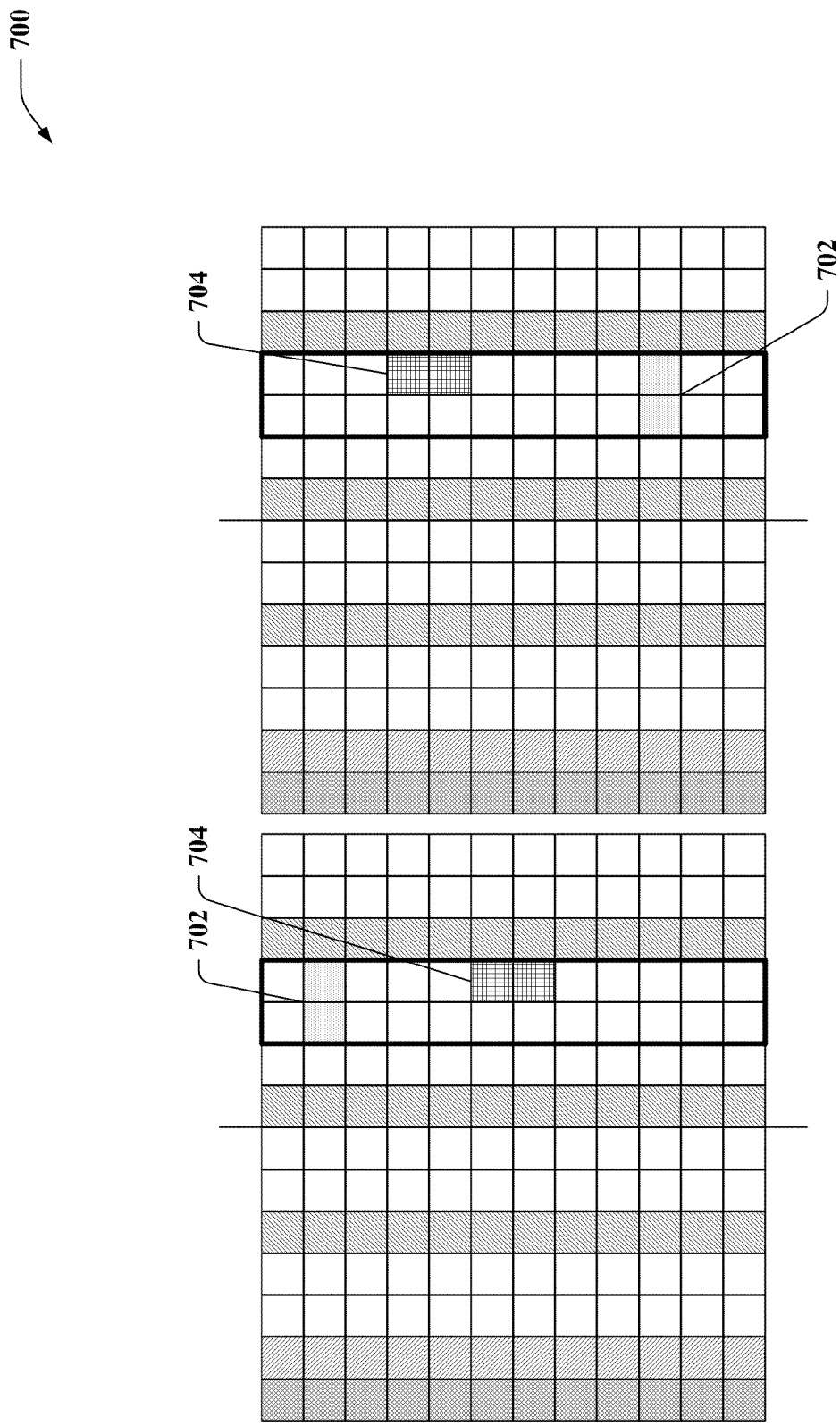
FIG. 7 illustrates example bandwidth over which new control data is transmitted according to a reuse scheme.

Turning now to FIG. 7, example portions of bandwidth 700 that can be utilized in a wireless communication network are displayed. Similarly to previous figures, the portions of bandwidth can be sub-frames in a 3GPP LTE configuration. Additionally, certain OFDM symbols in each sub-frame can be reserved for control data and/or reference signals, as described. Moreover, a global control segment is defined over which access points can silence communication except when transmitting control data. As depicted, two access points transmit control data at 702 and 704 respectively in each sub-frame according to a reuse pattern, which can be random, pseudo-random, etc. based on an identifier of a related access point, according to a time-varying scheme, and/or the like. In addition, the control data 702 and 704 are transmitted over multiple tones and/or multiple OFDM symbols to provide diversity. Thus, if one or more of the tones are interfered (e.g., by a legacy device not implementing the global control segment and transmitting general data over the resources), the other, with some likelihood, will not be interfered. Though two contiguous transmissions are shown for each control data 702 and 704, it is to be appreciated that more are possible and increase the likelihood of not being interfered. Moreover, it is to be appreciated that reuse schemes can be developed based on identifiers of a related access point, functionalities of the access point, service provider of the access point, location of the access point, reuse schemes of surrounding access points, and/or the like.

Figure 8:
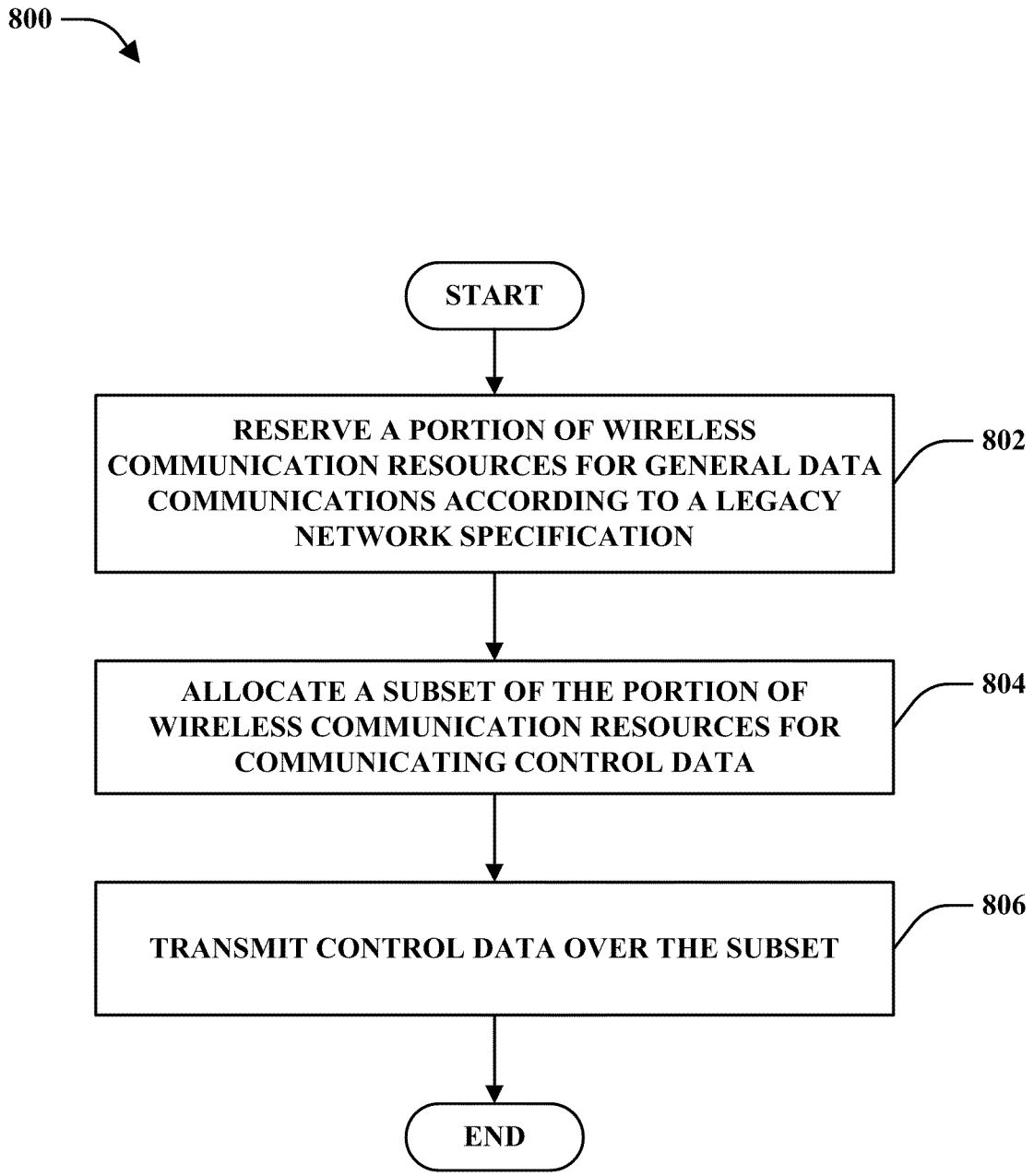
FIG. 8 is a flow diagram of an example methodology that facilitates defining and utilizing new control data resources.
Figure 9:
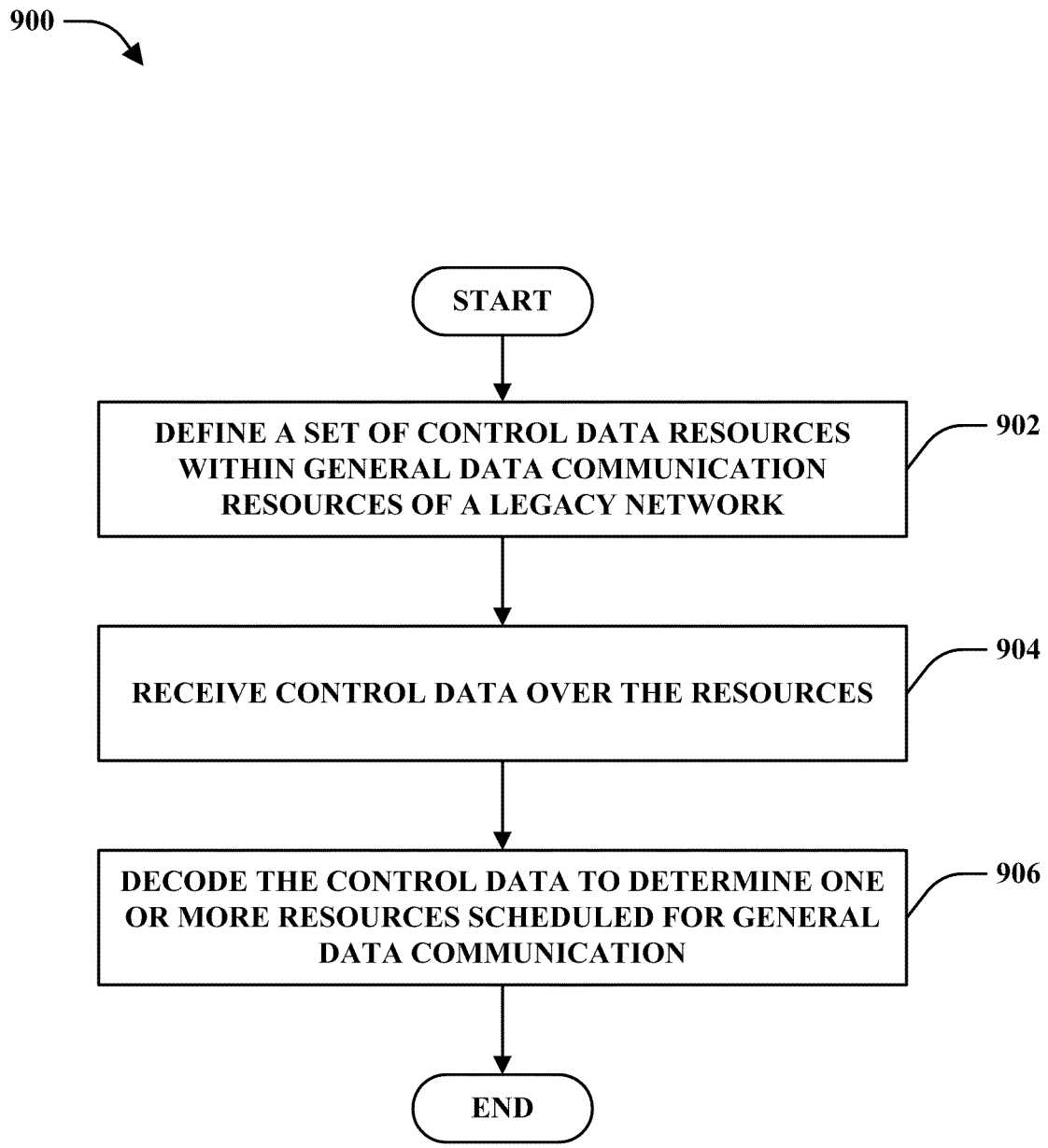
FIG. 9 is a flow diagram of an example methodology that receives control data over newly defined control data resources.

Referring now to FIGS. 8-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for defining and communicating over new control channels in a wireless network. At 802, a portion of wireless communication resources can be reserved for general data communication according to a legacy network specification. As described, the portion of resources can be reserved based on negative implication, in one example, where disparate resources are reserved for control data and/or reference signal transmissions. In this example, the portion reserved for data communications are inferred as at least a portion of those not reserved for control data and/or reference signal transmissions.

At 804, a subset of the portion of wireless communication resource can be allocated for communicating control data. This can be according to a new network specification, in one example. Using the general data resources for defining new control channels, as described, can mitigate interference caused over legacy control channels (which are likely heavily used by various devices) and allow support for legacy devices. In addition, the subset can be avoided for scheduling data communication resources to one or more mobile devices, effectively defining a global control segment among supporting devices. At 806, the control data can be transmitted over the subset. As described, the control data can be transmitted using beacon signaling, control resource blanking, reuse mechanisms, and/or the like, for example.

Turning to FIG. 9, a methodology 900 is illustrated that defines control channels in data communication space of a legacy wireless network. At 902, a set of control data resources can be defined within general data communication resources of a legacy network. It is to be appreciated that the legacy network specification can be known and/or a disparate network specification that effectuates the control data resource definition. At 904, control data is received over the resources. In one example, the control data can be received from an access point that similarly defines control data resources over the legacy data communication resources. At 906, the control data can be decoded to determine one or more resources scheduled for general data communication. In this regard, the control data received over the control data resources can relate to scheduling data communications for wireless network access.

It will be appreciated that, in accordance with one or more aspects described herein, inferences can be made regarding determining general data communication resource locations, new control data and/or related sub-frame formats, legacy specifications, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
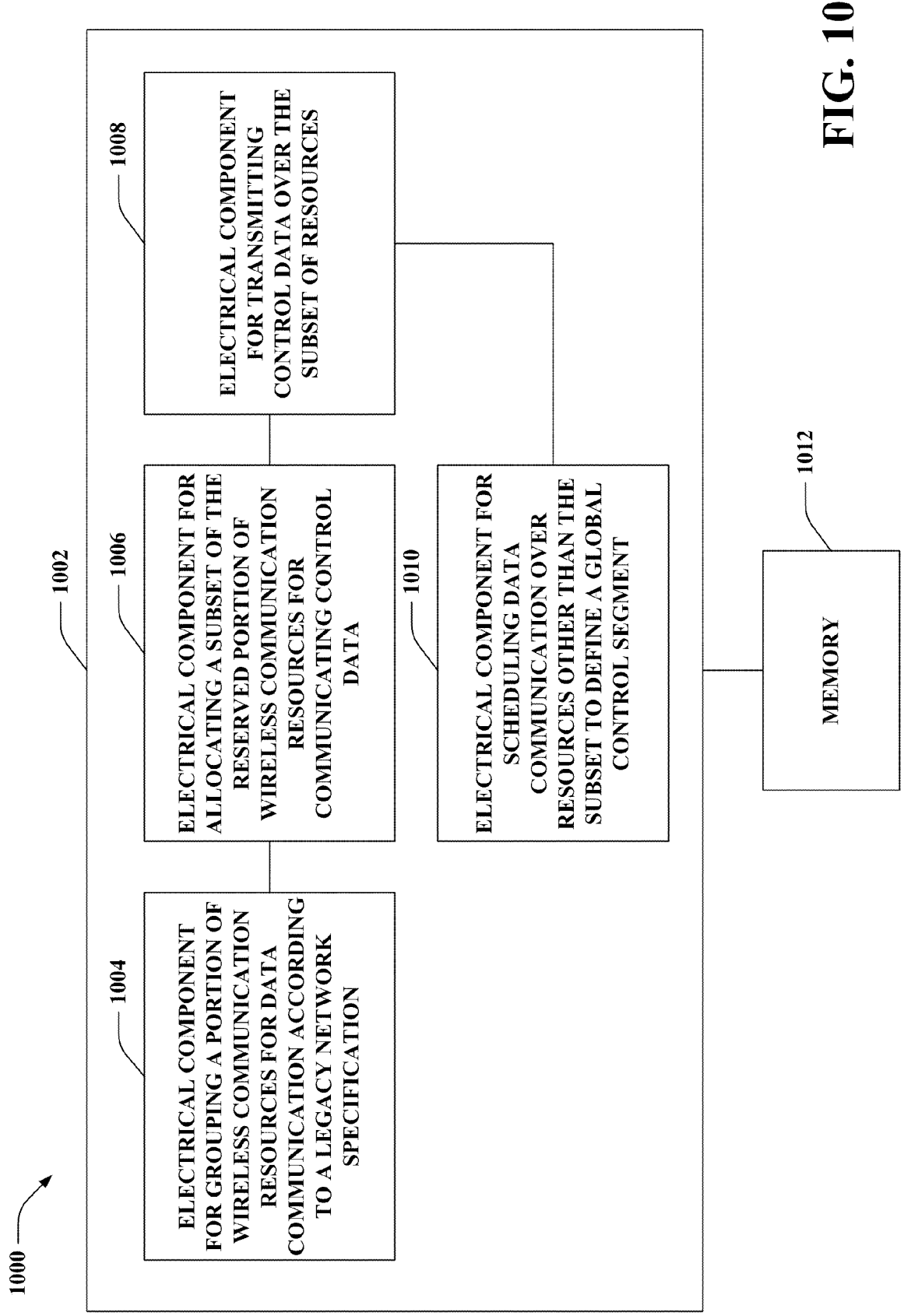
FIG. 10 is a block diagram of an example apparatus that allocates new control data resources over a legacy wireless network.

With reference to FIG. 10, illustrated is a system 1000 that defines new control channels for utilization in a wireless communication network. For example, system 1000 can reside at least partially within a base station, mobile device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for grouping a portion of wireless communication resources for data communication according to a legacy network specification 1004. In one example, the resources can be grouped based at least in part on identifying a collection of resources reserved for legacy control data and/or reference signal communications; at least a portion of the resources not in the collection can be grouped for data communication. Further, logical grouping 1002 can comprise an electrical component for allocating a subset of the reserved portion of wireless communication resources for communicating control data 1006. As described, utilizing the data communication resources allows for supporting legacy devices and minimizing interference over the new control data resources.

Furthermore, logical grouping 1002 can include an electrical component for transmitting control data over the subset of resources 1008. As described, the control data can be transmitted in a beacon signal, according to a reuse scheme, using control resource blanking to define a global control segment, and/or the like. Moreover, logical grouping 1002 can include an electrical component for scheduling data communication over resources other than the subset to define a global control segment 1010. As mentioned, blanking over the resources allows for observance of a global control segment. Where systems implementing the described functionality refrain from scheduling data transmissions over the segment, the segment can be substantially non-interfered by the systems resulting in a control segment having low interference. Additionally, system 1000 can include a memory 1012 that retains instructions for executing functions associated with electrical components 1004, 1006, 1008, and 1010. While shown as being external to memory 1012, it is to be understood that one or more of electrical components 1004, 1006, 1008, and 1010 can exist within memory 1012.

Figure 11:
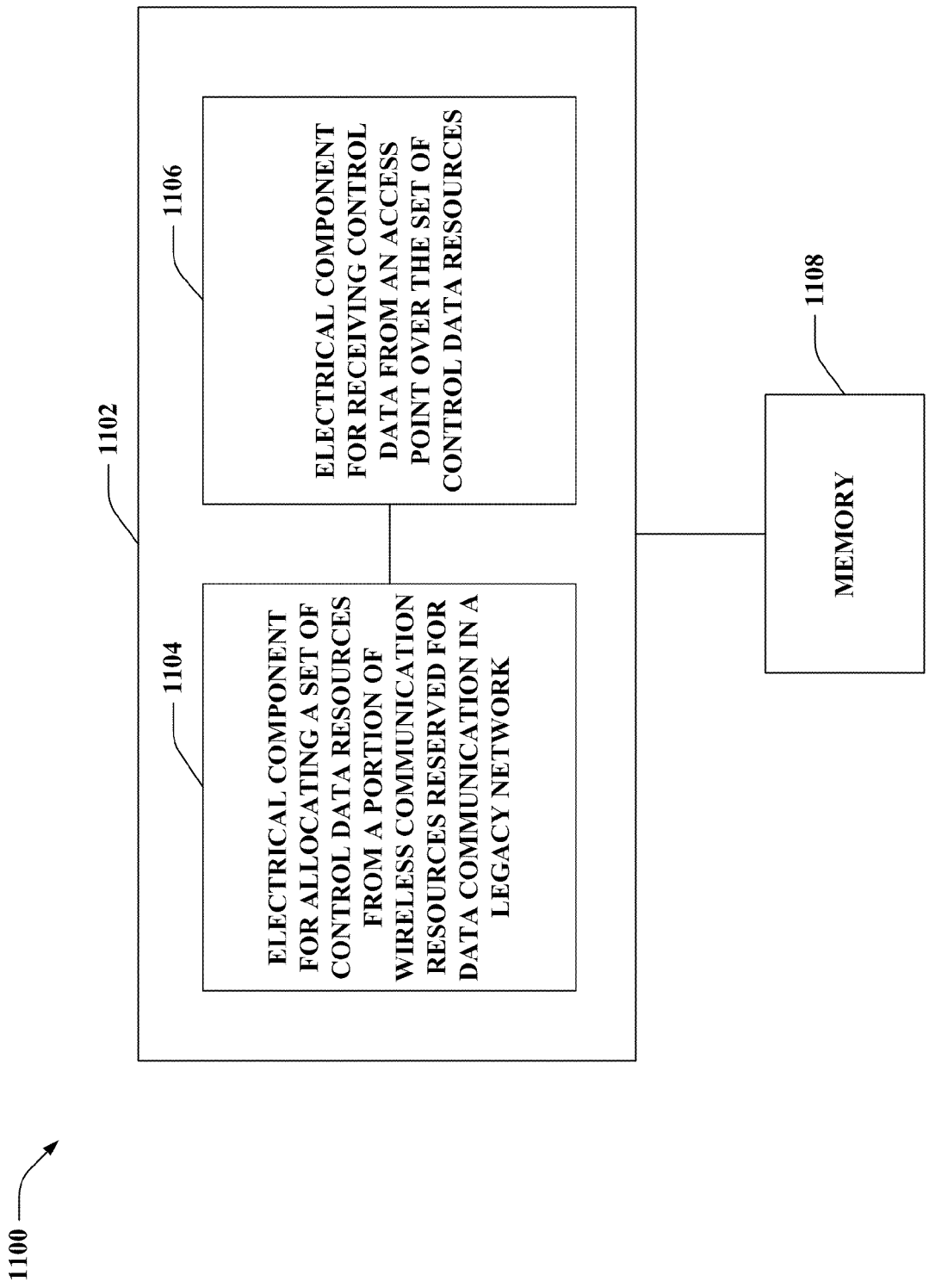
FIG. 11 is a block diagram of an example apparatus that facilitates receiving control data over new control resources in a legacy wireless network.

With reference to FIG. 11, illustrated is a system 1100 that communicates over newly defined control channels in a wireless network. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for allocating a set of control data resources from a portion of wireless communication resources reserved for data communication in a legacy network 1104. For example, the set of control data resources can be received from an access point or otherwise as part of a network specification, along with additional communication parameters, as described. Further, logical grouping 1102 can comprise an electrical component for receiving control data from an access point over the set of control data resources 1106. The control data can be received from an access point, for example, and can comprise a resource grant, quality information or acknowledgement indicators for established channels, and/or other control data. Additionally, system 1100 can include a memory 1108 that retains instructions for executing functions associated with electrical components 1104 and 1106. While shown as being external to memory 1108, it is to be understood that one or more of electrical components 1104 and 1106 can exist within memory 1108.

Figure 12:
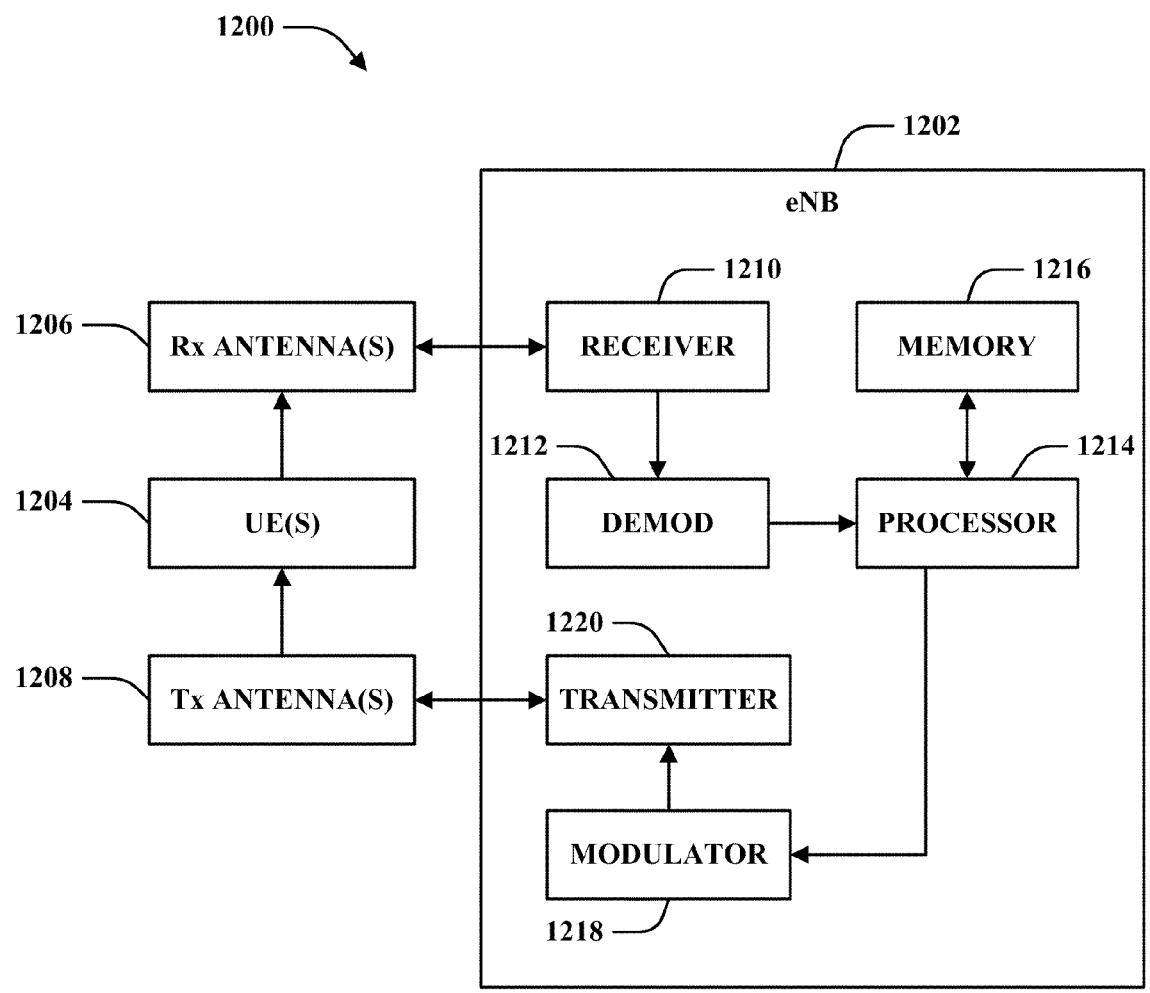
FIGS. 12-13 are block diagrams of example wireless communication devices that can be utilized to implement various aspects of the functionality described herein.

FIG. 12 is a block diagram of a system 1200 that can be utilized to implement various aspects of the functionality described herein. In one example, system 1200 includes a base station or eNB 1202. As illustrated, eNB 1202 can receive signal(s) from one or more UEs 1204 via one or more receive (Rx) antennas 1206 and transmit to the one or more UEs 1204 via one or more transmit (Tx) antennas 1208. Additionally, eNB 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. In one example, eNB 1202 can employ processor 1214 to perform methodologies 600, 700, and/or other similar and appropriate methodologies. eNB 1202 can also include a modulator 1218 that can multiplex a signal for transmission by a transmitter 1220 through transmit antenna(s) 1208.

Figure 13:
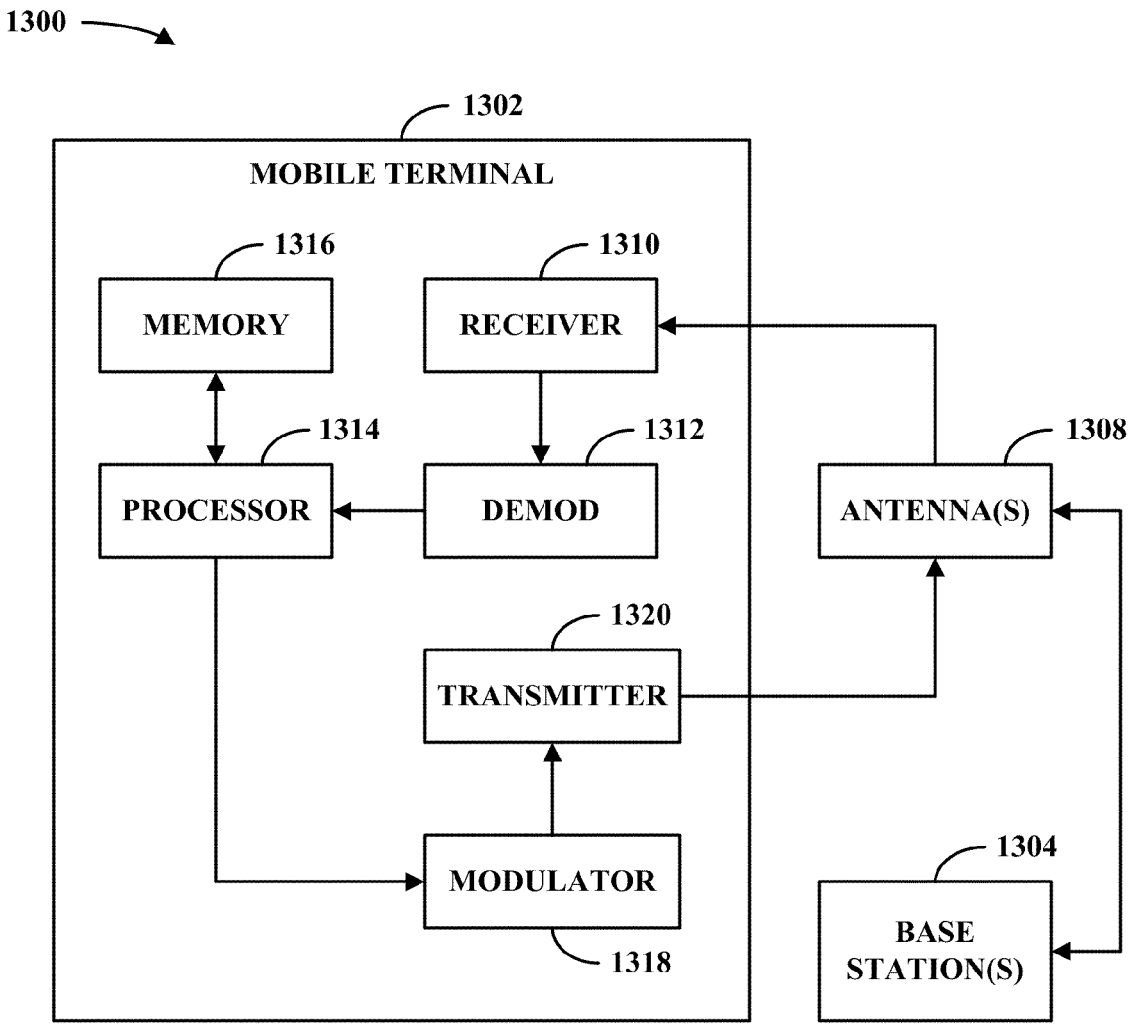

FIG. 13 is a block diagram of another system 1300 that can be utilized to implement various aspects of the functionality described herein. In one example, system 1300 includes a mobile terminal 1302. As illustrated, mobile terminal 1302 can receive signal(s) from one or more base stations 1304 and transmit to the one or more base stations 1304 via one or more antennas 1308. Additionally, mobile terminal 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile terminal 1302. Additionally, mobile terminal 1302 can employ processor 1314 to perform methodologies 600, 700, and/or other similar and appropriate methodologies. Mobile terminal 1302 can also employ one or more components described in previous figures to effectuate the described functionality; in one example, the components can be implemented by the processor 1314. Mobile terminal 1302 can also include a modulator 1318 that can multiplex a signal for transmission by a transmitter 1320 through antenna(s) 1308.

Figure 14:
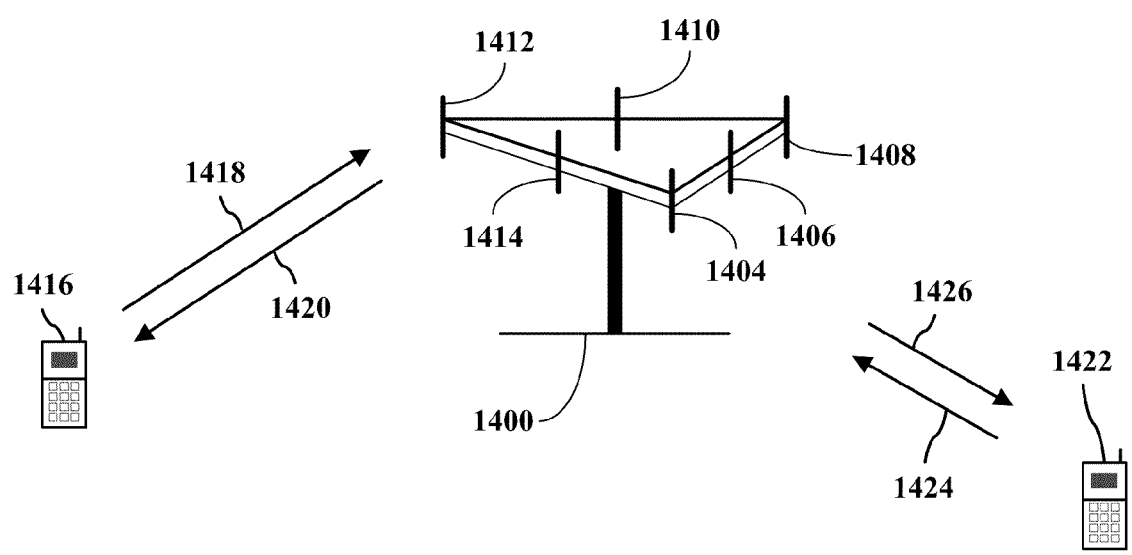
FIG. 14 illustrates an example wireless multiple-access communication system in accordance with various aspects set forth herein.

Referring now to FIG. 14, an illustration of a wireless multiple-access communication system is provided in accordance with various aspects. In one example, an access point 1400 (AP) includes multiple antenna groups. As illustrated in FIG. 14, one antenna group can include antennas 1404 and 1406, another can include antennas 1408 and 1410, and another can include antennas 1412 and 1414. While only two antennas are shown in FIG. 14 for each antenna group, it should be appreciated that more or fewer antennas may be utilized for each antenna group. In another example, an access terminal 1416 can be in communication with antennas 1412 and 1414, where antennas 1412 and 1414 transmit information to access terminal 1416 over forward link 1420 and receive information from access terminal 1416 over reverse link 1418. Additionally and/or alternatively, access terminal 1422 can be in communication with antennas 1406 and 1408, where antennas 1406 and 1408 transmit information to access terminal 1422 over forward link 1426 and receive information from access terminal 1422 over reverse link 1424. In a frequency division duplex system, communication links 1418, 1420, 1424 and 1426 can use different frequency for communication. For example, forward link 1420 may use a different frequency then that used by reverse link 1418.

Each group of antennas and/or the area in which they are designed to communicate can be referred to as a sector of the access point. In accordance with one aspect, antenna groups can be designed to communicate to access terminals in a sector of areas covered by access point 1400. In communication over forward links 1420 and 1426, the transmitting antennas of access point 1400 can utilize beamforming in order to improve the signal-to-noise ratio of forward links for the different access terminals 1416 and 1422. Also, an access point using beamforming to transmit to access terminals scattered randomly through its coverage causes less interference to access terminals in neighboring cells than an access point transmitting through a single antenna to all its access terminals.

An access point, e.g., access point 1400, can be a fixed station used for communicating with terminals and can also be referred to as a base station, an eNB, an access network, and/or other suitable terminology. In addition, an access terminal, e.g., an access terminal 1416 or 1422, can also be referred to as a mobile terminal, user equipment, a wireless communication device, a terminal, a wireless terminal, and/or other appropriate terminology.

Figure 15:
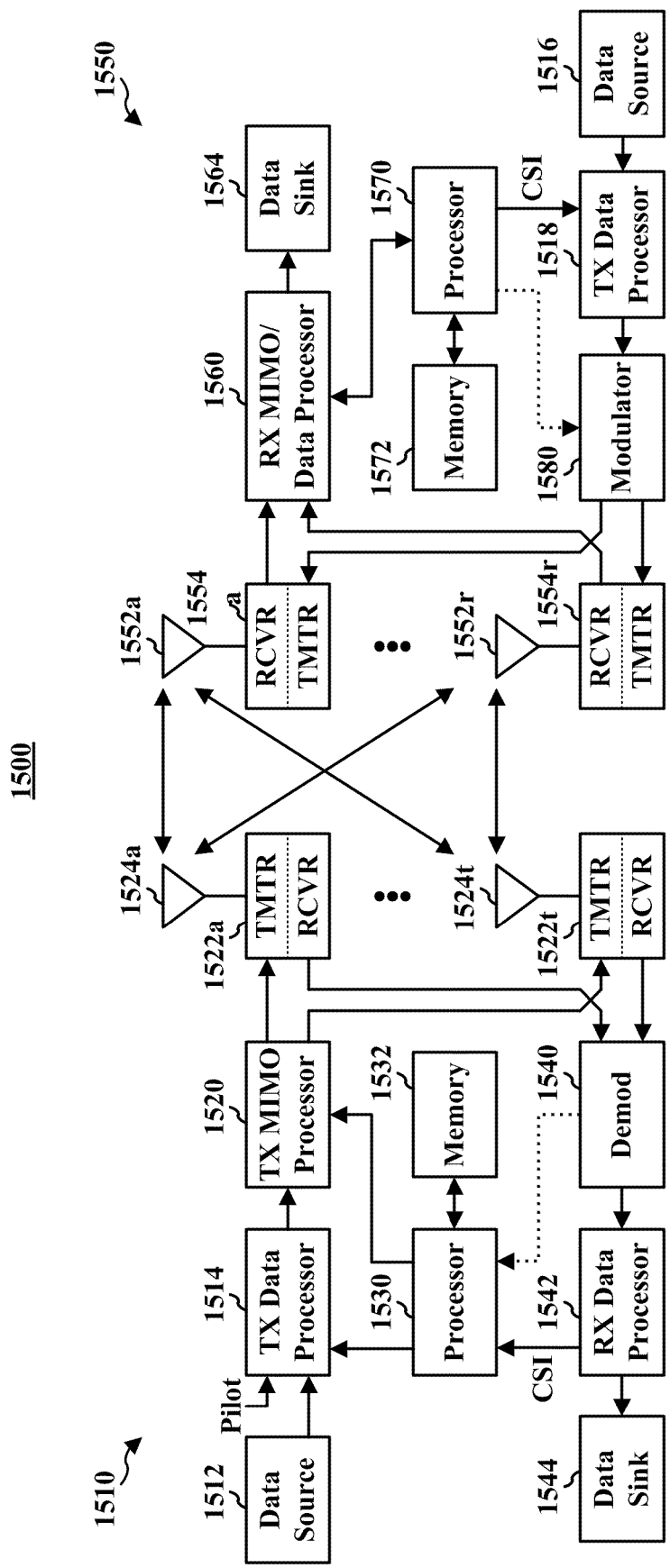
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides NT modulation symbol streams to NT transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, NT modulated signals from transceivers 1522a through 1522t can then be transmitted from NT antennas 1524a through 1524t, respectively.

In accordance with another aspect, the transmitted modulated signals can be received at receiver system 1550 by NR antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the NR received symbol streams from NR transceivers 1554 based on a particular receiver processing technique to provide NT "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the NR received signals to detect the NT transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 16:
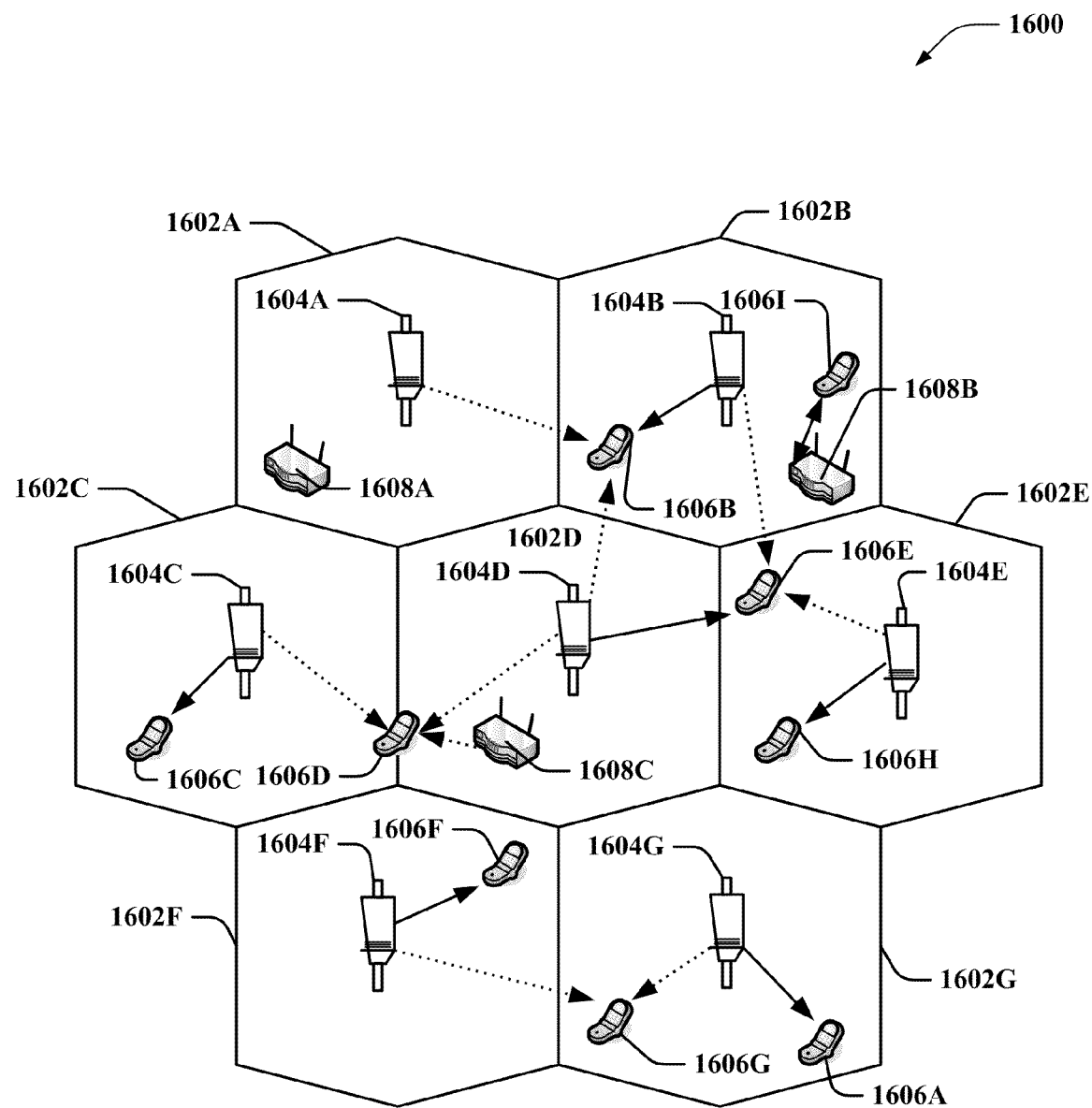
FIG. 16 is an illustration of a wireless communication network that can support and utilize various aspects described herein.

Now referring to FIG. 16, a wireless communication system 1600 configured to support a number of mobile devices is illustrated. The system 1600 provides communication for multiple cells, such as for example, macrocells 1602A-1602G, with each cell being serviced by a corresponding access point 1604A-1604G. As described previously, for instance, the access points 1604A-1604G related to the macrocells 1602A-1602G can be base stations. Mobile devices 1606A-1606I are shown dispersed at various locations throughout the wireless communication system 1600. Each mobile device 1606A-1606I can communicate with one or more access points 1604A-1604G on a forward link and/or a reverse link, as described. In addition, access points 1608A-1608C are shown. These can be smaller scale access points, such as femtocells, offering services related to a particular service location, as described. The mobile devices 1606A-1606I can additionally communicate with these smaller scale access points 1608A-1608C to receive offered services. The wireless communication system 1600 can provide service over a large geographic region, in one example (e.g., macrocells 1602A-1602G can cover a few blocks in a neighborhood, and the femtocell access points 1608A-1608C can be present in areas such as residences, office buildings, and/or the like as described). In an example, the mobile devices 1606A-1606I can establish connection with the access points 1604A-1604G and/or 1608A-1608C over the air and/or over a backhaul connection.

Additionally, as shown, the mobile devices 1606A-1606I can travel throughout the system 1600 and can reselect cells related to the various access points 1604A-1604G and/or 1608A-1608C as it moves through the different macrocells 1602A-1602G or femtocell coverage areas. In one example, one or more of the mobile devices 1606A-1606I can be associated with a home femtocell related to at least one of femtocell access points 1608A-1608C. For example, mobile device 1606I can be associated with femtocell access point 1608B as its home femtocell. Thus, though mobile device 1606I is in macrocell 1602B, and thus in coverage area of access point 1604B, it can communicate with the femtocell access point 1608B instead of (or in addition to) access point 1604B. In one example, the femtocell access point 1608B can provide additional services to the mobile device 1606I, such as desirable billing or charges, minute usage, enhanced services (e.g., faster broadband access, media services, etc.). Thus, when the mobile device 1606I is in range of the femtocell access point 1608B, it can favor the femtocell access point 1608B in reselection. When communicating with femtocell access point 1608B, the mobile device 1606I can experience interference from access point 1604B, or surrounding devices communicating therewith, over various channels. In addition, the femtocell access point 1608B and/or mobile device 1606I can cause the access point 1604B and/or communicating devices interference as well.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for receiving control data over non-legacy control channels in a wireless communication network, comprising:
    receiving non-legacy control data over a set of non-legacy control data resources, wherein the set of non-legacy control data resources comprise at least a portion of one or more orthogonal frequency division multiplexing (OFDM) symbols, wherein the set of non-legacy control data resources are defined within general data communication resources of a legacy network specification, and wherein the legacy network specification comprises a third generation partnership project (3GPP) long term evolution (LTE) specification and the defined non-legacy control data resources comprise at least one reserved resource block in at least one subframe; and decoding the non-legacy control data for scheduling data communications for wireless network access;

wherein receiving the non-legacy control data includes receiving the non-legacy control data in resources within the set of non-legacy control data resources selected according to a reuse pattern based on an identifier of an access point.

2. The method of claim 1, wherein receiving the non-legacy control data includes receiving a beacon signal that comprises the non-legacy control data.

3. A wireless communications apparatus, comprising:
at least one processor configured to:
define a set of non-legacy control data resources, comprising at least a portion of one or more orthogonal frequency division multiplexing (OFDM) symbols, over a portion of wireless communication resources allocated for general data communication in a legacy network, wherein the legacy network comprises a third generation partnership project (3GPP) long term evolution (LTE) specification and the defined control data resources comprise at least one reserved resource block in at least one subframe;
receive non-legacy control data from an access point over the non-legacy control data resources; and
decode the non-legacy control data to determine a general data resource allocation from the access point;
wherein the at least one processor receives the non-legacy control data as the non-legacy control data in resources within the set of non-legacy control data resources selected according to a reuse pattern based on an identifier of the access point; and
a memory coupled to the at least one processor.

4. The wireless communications apparatus of claim 3, wherein the at least one processor receives the non-legacy control data as one or more beacon signals transmitted by the access point.

5. An apparatus that facilitates receiving control data over non-legacy defined control channels, comprising:
means for receiving non-legacy control data over a set of non-legacy control data resources, wherein the set of non-legacy control data resources comprise at least a portion of one or more orthogonal frequency division multiplexing (OFDM) symbols, wherein the set of non-legacy control data resources are defined within general data communication resources of a legacy network specification, and wherein the legacy network specification comprises a third generation partnership project (3GPP) long term evolution (LTE) specification and the defined non-legacy control data resources comprise at least one reserved resource block in at least one subframe; and
means for decoding the non-legacy control data to determine a general data resource allocation from an access point;
wherein the means for receiving receives the non-legacy control data as the non-legacy control data in resources within the set of non-legacy control data resources selected according to a reuse pattern based on an identifier of the access point.

6. The apparatus of claim 5, wherein the means for receiving receives the non-legacy control data as one or more beacon signals.

7. A non-transitory computer-readable medium comprising:
code for causing at least one computer to receive non-legacy control data over a set of non-legacy control data resources, wherein the set of non-legacy control data resources comprise at least a portion of one or more orthogonal frequency division multiplexing (OFDM) symbols, wherein the set of non-legacy control data resources are defined within general data communication resources of a legacy network specification, and wherein the legacy network specification comprises a third generation partnership project (3GPP) long term evolution (LTE) specification and the defined non-legacy control data resources comprise at least one reserved resource block in at least one subframe; and
code for causing the at least one computer to decode the non-legacy control data for scheduling data communications for wireless network access;
wherein the code for causing the at least one computer to receive the non-legacy control data causing the at least one computer to receive the non-legacy control data as the non-legacy control data in resources within the set of non-legacy control data resources selected according to a reuse pattern based on an identifier of an access point.

8. An apparatus, comprising:
a receiver configured to receive non-legacy control data, from an access point, over a set of non-legacy control data resources, wherein the set of non-legacy control data resources comprise at least a portion of one or more orthogonal frequency division multiplexing (OFDM) symbols, wherein the set of non-legacy control data resources are defined within general data communication resources of a legacy network specification, and wherein the legacy network specification comprises a third generation partnership project (3GPP) long term evolution (LTE) specification and the defined non-legacy control data resources comprise at least one reserved resource block in at least one subframe; and
a processor configured to decode the non-legacy control data for scheduling data communications for wireless network access;
wherein the receiver receives the non-legacy control data as the non-legacy control data in resources within the set of non-legacy control data resources selected according to a reuse pattern based on an identifier of the access point.

9. The apparatus of claim 8, wherein the receiver receives the non-legacy control data as one or more beacon signals.

10. A method for receiving control data over non-legacy control channels in a wireless communication network, comprising:
receiving non-legacy control data over a set of non-legacy control data resources defined within general data communication resources of a legacy network specification, wherein the non-legacy control data resources are frequency multiplexed with the general data communication resources in a same time slot; and
decoding the non-legacy control data for scheduling data communications for wireless network access;
wherein the step of receiving the non-legacy control data comprises receiving the non-legacy control data in resources within the set of non-legacy control data resources selected according to a reuse pattern based on an identifier of an access point.

11. The method of claim 10, wherein the step of receiving the non-legacy control data comprises receiving a beacon signal that comprises the non-legacy control data.

12. A wireless communications apparatus, comprising:
at least one processor configured to:
define a set of non-legacy control data resources over a portion of wireless communication resources allocated for general data communication in a legacy network, wherein the non-legacy control data resources are frequency multiplexed with the general data communication resources in a same time slot;
receive non-legacy control data from an access point over the non-legacy control data resources;
decode the non-legacy control data to determine a general data resource allocation from the access point;
wherein the at least one processor receives the non-legacy control data as the non-legacy control data in resources within the set of non-legacy control data resources selected according to a reuse pattern based on an identifier of the access point; and
a memory coupled to the at least one processor.

13. The wireless communications apparatus of claim 12, wherein the at least one processor receives the non-legacy control data as one or more beacon signals transmitted by the access point.

14. An apparatus that facilitates receiving control data over non-legacy defined control channels, comprising:
means for receiving non-legacy control data, from an access point, over a set of non-legacy control data resources defined within general data communication resources of a legacy network specification, wherein the non-legacy control data resources are frequency multiplexed with the general data communication resources in a same time slot; and
means for decoding the non-legacy control data for scheduling data communications for wireless network access;
wherein the means for receiving receives the non-legacy control data as the non-legacy control data in resources within the set of non-legacy control data resources selected according to a reuse pattern based on an identifier of the access point.

15. The apparatus of claim 14, wherein the means for receiving receives the non-legacy control data as one or more beacon signals.

16. A non-transitory computer-readable medium comprising:
code for causing at least one computer to receive non-legacy control data over a set of non-legacy control data resources defined within general data communication resources of a legacy network specification, wherein the non-legacy control data resources are frequency multiplexed with the general data communication resources in a same time slot; and
code for causing the at least one computer to decode the non-legacy control data for scheduling data communications for wireless network access;
wherein the code for causing the at least one computer to receive the non-legacy control data causing the at least one computer to receive the non-legacy control data as the non-legacy control data in resources within the set of non-legacy control data resources selected according to a reuse pattern based on an identifier of an access point.

17. An apparatus, comprising:
a receiver configured to receive non-legacy control data, from an access point, over a set of non-legacy control data resources defined within general data communication resources of a legacy network specification, wherein the non-legacy control data resources are frequency multiplexed with the general data communication resources in a same time slot; and
a processor configured to decode the non-legacy control data for scheduling data communications for wireless network access;
wherein the receiver receives the non-legacy control data as the non-legacy control data in resources within the set of non-legacy control data resources selected according to a reuse pattern based on an identifier of the access point.

18. The apparatus of claim 17, wherein the receiver receives the non-legacy control data as one or more beacon signals.

* * * * *